(12) United States Patent
Vorbach et al.

(10) Patent No.: US 7,657,877 B2
(45) Date of Patent: Feb. 2, 2010

(54) METHOD FOR PROCESSING DATA

(75) Inventors: Martin Vorbach, Munich (DE); Armin Nückel, Neupotz (DE); Frank May, Munich (DE); Markus Weinhardt, Munich (DE); Joao Manuel Paiva Cardoso, Vila Nova de Paiva (PT)

(73) Assignee: Pact XPP Technologies AG, München (DE)

( * ) Notice: Subject to any disclaimer, the term of this patent is extended or adjusted under 35 U.S.C. 154(b) by 530 days.

(21) Appl. No.: 10/480,003
(22) PCT Filed: Jun. 20, 2002
(86) PCT No.: PCT/EP02/06865
§ 371 (c)(1), (2), (4) Date: Jun. 18, 2004
(87) PCT Pub. No.: WO02/103532
PCT Pub. Date: Dec. 27, 2002

(65) Prior Publication Data
US 2004/0243984 A1    Dec. 2, 2004

(30) Foreign Application Priority Data

| Jun. 20, 2001 | (DE) | 101 29 237 |
| Jun. 20, 2001 | (EP) | 01115021 |
| Jul. 24, 2001 | (DE) | 101 35 210 |
| Jul. 24, 2001 | (DE) | 101 35 211 |
| Aug. 16, 2001 | (DE) | 101 39 170 |
| Aug. 29, 2001 | (DE) | 101 42 231 |
| Sep. 3, 2001 | (DE) | 101 42 894 |
| Sep. 3, 2001 | (DE) | 101 42 903 |
| Sep. 3, 2001 | (DE) | 101 42 904 |
| Sep. 11, 2001 | (DE) | 101 44 732 |
| Sep. 11, 2001 | (DE) | 101 44 733 |
| Sep. 17, 2001 | (DE) | 101 45 792 |
| Sep. 17, 2001 | (DE) | 101 45 795 |
| Sep. 19, 2001 | (DE) | 101 46 132 |
| Nov. 5, 2001 | (DE) | 101 54 259 |
| Nov. 5, 2001 | (DE) | 101 54 260 |
| Dec. 14, 2001 | (EP) | 01129923 |
| Jan. 18, 2002 | (EP) | 02001331 |
| Jan. 19, 2002 | (DE) | 102 02 044 |
| Jan. 20, 2002 | (DE) | 102 02 175 |
| Feb. 15, 2002 | (DE) | 102 06 653 |
| Feb. 18, 2002 | (DE) | 102 06 856 |
| Feb. 18, 2002 | (DE) | 102 06 857 |
| Feb. 21, 2002 | (DE) | 102 07 224 |
| Feb. 21, 2002 | (DE) | 102 07 225 |
| Feb. 21, 2002 | (DE) | 102 07 226 |
| Feb. 27, 2002 | (DE) | 102 08 434 |
| Feb. 27, 2002 | (DE) | 102 08 435 |
| Mar. 21, 2002 | (DE) | 102 12 621 |
| Mar. 21, 2002 | (DE) | 102 12 622 |
| May 2, 2002 | (EP) | 02009868 |

(51) Int. Cl.
*G06F 9/44* (2006.01)
(52) U.S. Cl. .......... 717/141; 717/136; 717/140; 717/149
(58) Field of Classification Search .......... 717/136–161
See application file for complete search history.

(56) References Cited

U.S. PATENT DOCUMENTS 2,067,477 A    1/1937    Cooper
(Continued)

FOREIGN PATENT DOCUMENTS

DE    42 21 278    1/1994
(Continued)

OTHER PUBLICATIONS

Arabi et al., "PLD Integrates Dedicated High-speed Data Buffering, Complex State Machine, and Fast Decode Array," conference record on WESCON '93, Sep. 28, 1993, pp. 432-436.
(Continued)

*Primary Examiner*—Wei Y Zhen
*Assistant Examiner*—Matthew J Brophy
(74) *Attorney, Agent, or Firm*—Kenyon & Kenyon LLP

(57) ABSTRACT

A method and device for translating a program to a system including at least one first processor and a reconfigurable unit. Code portions of the program which are suitable for the reconfigurable unit are determined. The remaining code of the program is extracted and/or separated for processing by the first processor.

20 Claims, 7 Drawing Sheets

U.S. PATENT DOCUMENTS

| | | |
|---|---|---|
| 3,242,998 A | 3/1966 | Gubbins |
| 3,681,578 A | 8/1972 | Stevens |
| 3,757,608 A | 9/1973 | Willner |
| 3,855,577 A | 12/1974 | Vandierendonck |
| 4,233,667 A | 11/1980 | Devine et al. |
| 4,414,547 A | 11/1983 | Knapp et al. |
| 4,498,134 A | 2/1985 | Etchells et al. |
| 4,498,172 A | 2/1985 | Bhavsar |
| 4,566,102 A | 1/1986 | Hefner |
| 4,571,736 A | 2/1986 | Agrawal et al. |
| 4,590,583 A | 5/1986 | Miller |
| 4,591,979 A | 5/1986 | Iwashita |
| 4,663,706 A | 5/1987 | Allen et al. |
| 4,667,190 A | 5/1987 | Fant et al. |
| 4,682,284 A | 7/1987 | Schrofer |
| 4,686,386 A | 8/1987 | Tadao |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,959,781 A | 9/1990 | Rubinstein et al. |
| 4,967,340 A | 10/1990 | Dawes |
| 4,972,314 A | 11/1990 | Getzinger et al. |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,041,924 A | 8/1991 | Blackborow et al. |
| 5,043,978 A | 8/1991 | Nagler et al. |
| 5,047,924 A | 9/1991 | Matsubara et al. |
| 5,065,308 A | 11/1991 | Evans |
| 5,072,178 A | 12/1991 | Matsumoto |
| 5,076,482 A | 12/1991 | Matsushima et al. |
| 5,081,375 A | 1/1992 | Pickett et al. |
| 5,099,447 A | 3/1992 | Myszewski |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,532 A | 2/1994 | Hunt |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,392,437 A | 2/1995 | Matter et al. |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,477,525 A | 12/1995 | Okabe |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,581,731 A | 12/1996 | King et al. |

| | | |
|---|---|---|
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,845 A | 2/1997 | Gilson |
| 5,611,049 A | 3/1997 | Pitts |
| 5,617,547 A | 4/1997 | Feeney et al. |
| 5,625,806 A | 4/1997 | Kromer |
| 5,625,836 A | 4/1997 | Barker et al. |
| 5,634,131 A | 5/1997 | Matter et al. |
| 5,646,544 A | 7/1997 | Iadanza |
| 5,646,545 A | 7/1997 | Trimberger et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |
| 5,659,797 A | 8/1997 | Zandveld et al. |
| 5,675,743 A | 10/1997 | Mavity |
| 5,680,583 A | 10/1997 | Kuijsten |
| 5,694,602 A | 12/1997 | Smith |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,737,516 A | 4/1998 | Circello et al. |
| 5,737,565 A | 4/1998 | Mayfield |
| 5,742,180 A | 4/1998 | Detton et al. |
| 5,745,734 A | 4/1998 | Craft et al. |
| 5,748,872 A | 5/1998 | Norman |
| 5,748,979 A | 5/1998 | Trimberger |
| 5,752,035 A * | 5/1998 | Trimberger ................ 717/153 |
| 5,754,459 A | 5/1998 | Telikepalli |
| 5,754,820 A | 5/1998 | Yamagami |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Trimberger et al. |
| 5,781,756 A | 7/1998 | Hung |
| 5,784,636 A | 7/1998 | Rupp |
| 5,794,059 A | 8/1998 | Barker et al. |
| 5,794,062 A | 8/1998 | Baxter |
| 5,801,547 A | 9/1998 | Kean |
| 5,801,715 A | 9/1998 | Norman |
| 5,802,290 A | 9/1998 | Casselman |
| 5,815,715 A | 9/1998 | Kayhan |
| 5,815,726 A | 9/1998 | Cliff |
| 5,821,774 A | 10/1998 | Veytsman et al. |
| 5,828,229 A | 10/1998 | Cliff et al. |
| 5,828,858 A | 10/1998 | Athanas et al. |
| 5,831,448 A | 11/1998 | Kean |
| 5,838,165 A | 11/1998 | Chatter |
| 5,841,973 A | 11/1998 | Kessler et al. |
| 5,844,422 A | 12/1998 | Trimberger et al. |
| 5,844,888 A | 12/1998 | Markkula, Jr. |
| 5,848,238 A | 12/1998 | Shimomura et al. |
| 5,854,918 A | 12/1998 | Baxter |
| 5,857,097 A | 1/1999 | Henzinger et al. |
| 5,859,544 A | 1/1999 | Norman |
| 5,860,119 A | 1/1999 | Dockser |
| 5,862,403 A | 1/1999 | Kanai et al. |
| 5,865,239 A | 2/1999 | Carr |
| 5,867,691 A | 2/1999 | Shiraishi |
| 5,867,723 A | 2/1999 | Peters et al. |
| 5,870,620 A | 2/1999 | Kadosumi et al. |
| 5,884,075 A | 3/1999 | Hester et al. |
| 5,887,162 A | 3/1999 | Williams et al. |
| 5,887,165 A | 3/1999 | Martel et al. |
| 5,889,533 A | 3/1999 | Lee |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,901,279 A | 5/1999 | Davis, III |
| 5,915,123 A | 6/1999 | Mirsky et al. |
| 5,924,119 A | 7/1999 | Sindhu et al. |
| 5,926,638 A | 7/1999 | Inoue |
| 5,927,423 A | 7/1999 | Wada et al. |
| 5,933,023 A | 8/1999 | Young |
| 5,933,642 A | 8/1999 | Baxter et al. |
| 5,936,424 A | 8/1999 | Young et al. |
| 5,943,242 A | 8/1999 | Vorbach et al. |
| 5,956,518 A | 9/1999 | DeHon et al. |
| 5,960,193 A | 9/1999 | Guttag et al. |
| 5,960,200 A | 9/1999 | Eager et al. |
| 5,966,143 A | 10/1999 | Breternitz, Jr. |
| 5,966,534 A * | 10/1999 | Cooke et al. ................ 717/155 |
| 5,970,254 A | 10/1999 | Cooke et al. |
| 5,978,260 A | 11/1999 | Trimberger et al. |
| 5,978,583 A * | 11/1999 | Ekanadham et al. ........ 717/106 |
| 5,996,083 A | 11/1999 | Gupta et al. |
| 5,999,990 A | 12/1999 | Sharrit et al. |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,020,760 A | 2/2000 | Sample et al. |
| 6,021,490 A | 2/2000 | Vorbach et al. |
| 6,023,564 A | 2/2000 | Trimberger |
| 6,023,742 A | 2/2000 | Ebeling et al. |
| 6,026,481 A | 2/2000 | New et al. |
| 6,034,538 A | 3/2000 | Abramovici |
| 6,035,371 A | 3/2000 | Magloire |
| 6,038,650 A | 3/2000 | Vorbach et al. |
| 6,038,656 A | 3/2000 | Cummings et al. |
| 6,044,030 A | 3/2000 | Zheng et al. |
| 6,047,115 A | 4/2000 | Mohan et al. |
| 6,049,222 A | 4/2000 | Lawman |
| 6,052,773 A | 4/2000 | DeHon et al. |
| 6,054,873 A | 4/2000 | Laramie |
| 6,058,469 A | 5/2000 | Baxter |
| 6,076,157 A | 6/2000 | Borkenhagen et al. |
| 6,077,315 A * | 6/2000 | Greenbaum et al. ......... 717/157 |
| 6,081,903 A | 6/2000 | Vorbach et al. |
| 6,084,429 A | 7/2000 | Trimberger |
| 6,085,317 A | 7/2000 | Smith |
| 6,086,628 A | 7/2000 | Dave et al. |
| 6,088,795 A | 7/2000 | Vorbach et al. |
| 6,092,174 A | 7/2000 | Roussakov |
| 6,105,105 A | 8/2000 | Trimberger et al. |
| 6,105,106 A | 8/2000 | Manning |
| 6,108,760 A | 8/2000 | Mirsky et al. |
| 6,119,181 A | 9/2000 | Vorbach et al. |
| 6,122,719 A | 9/2000 | Mirsky et al. |
| 6,125,408 A | 9/2000 | McGee et al. |
| 6,127,908 A | 10/2000 | Bozler et al. |
| 6,131,149 A | 10/2000 | Nguyen |
| 6,134,166 A | 10/2000 | Lytle et al. |
| 6,137,307 A | 10/2000 | Iwanczuk et al. |
| 6,150,837 A | 11/2000 | Beal et al. |
| 6,150,839 A | 11/2000 | New et al. |
| 6,154,048 A | 11/2000 | Iwanczuk et al. |
| 6,154,049 A | 11/2000 | New |
| 6,157,214 A | 12/2000 | Marshall |
| 6,170,051 B1 | 1/2001 | Dowling |
| 6,172,520 B1 | 1/2001 | Lawman et al. |
| 6,173,434 B1 | 1/2001 | Wirthlin et al. |
| 6,185,256 B1 | 2/2001 | Saito et al. |

| Patent No. | Date | Inventor(s) |
|---|---|---|
| 6,185,731 B1 | 2/2001 | Maeda et al. |
| 6,188,240 B1 | 2/2001 | Nakaya |
| 6,188,650 B1 | 2/2001 | Hamada et al. |
| 6,198,304 B1 | 3/2001 | Sasaki |
| 6,201,406 B1 | 3/2001 | Iwanczuk et al. |
| 6,202,182 B1 | 3/2001 | Abramovici et al. |
| 6,204,687 B1 | 3/2001 | Schultz et al. |
| 6,211,697 B1 | 4/2001 | Lien et al. |
| 6,212,650 B1 | 4/2001 | Guccione |
| 6,215,326 B1 | 4/2001 | Jefferson et al. |
| 6,216,223 B1 | 4/2001 | Revilla et al. |
| 6,219,833 B1 * | 4/2001 | Solomon et al. ............ 717/149 |
| RE37,195 E | 5/2001 | Kean |
| 6,230,307 B1 | 5/2001 | Davis et al. |
| 6,240,502 B1 | 5/2001 | Panwar et al. |
| 6,243,808 B1 | 6/2001 | Wang |
| 6,247,147 B1 | 6/2001 | Beenstra et al. |
| 6,252,792 B1 | 6/2001 | Marshall et al. |
| 6,256,724 B1 | 7/2001 | Hocevar et al. |
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,440 B1 | 9/2001 | Casselman |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,311,265 B1 | 10/2001 | Beckerle et al. |
| 6,321,366 B1 | 11/2001 | Tseng et al. |
| 6,321,373 B1 * | 11/2001 | Ekanadham et al. ........ 717/119 |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,398,383 B1 | 6/2002 | Huang |
| 6,400,601 B1 | 6/2002 | Sudo et al. |
| 6,404,224 B1 | 6/2002 | Azegami et al. |
| 6,405,299 B1 | 6/2002 | Vorbach et al. |
| 6,421,808 B1 | 7/2002 | McGeer |
| 6,421,809 B1 | 7/2002 | Wuytack et al. |
| 6,421,817 B1 | 7/2002 | Mohan et al. |
| 6,425,054 B1 | 7/2002 | Nguyen |
| 6,425,068 B1 | 7/2002 | Vorbach et al. |
| 6,426,649 B1 | 7/2002 | Fu et al. |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,695 B1 | 8/2002 | Esfahani et al. |
| 6,434,699 B1 | 8/2002 | Jones et al. |
| 6,437,441 B1 | 8/2002 | Yamamoto |
| 6,438,747 B1 | 8/2002 | Schreiber et al. |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,483,343 B1 | 11/2002 | Faith et al. |
| 6,487,709 B1 | 11/2002 | Keller et al. |
| 6,490,695 B1 | 12/2002 | Zagorski et al. |
| 6,496,971 B1 | 12/2002 | Lesea et al. |
| 6,507,947 B1 | 1/2003 | Schreiber et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 | 2/2003 | Veenstra et al. |
| 6,526,520 B1 | 2/2003 | Vorbach et al. |
| 6,538,468 B1 | 3/2003 | Moore |
| 6,538,470 B1 | 3/2003 | Langhammer et al. |
| 6,539,415 B1 | 3/2003 | Mercs |
| 6,539,438 B1 | 3/2003 | Ledzius et al. |
| 6,539,477 B1 | 3/2003 | Seawright |
| 6,542,394 B2 | 4/2003 | Marshall et al. |
| 6,542,844 B1 | 4/2003 | Hanna |
| 6,542,998 B1 | 4/2003 | Vorbach et al. |
| 6,553,395 B2 | 4/2003 | Marshall et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,665,758 B1 | 12/2003 | Frazier et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,708,325 B2 * | 3/2004 | Cooke et al. ................. 717/124 |
| 6,717,436 B2 | 4/2004 | Kress et al. |
| 6,721,830 B2 | 4/2004 | Vorbach et al. |
| 6,728,871 B1 | 4/2004 | Vorbach |
| 6,748,440 B1 | 6/2004 | Lisitsa et al. |
| 6,754,805 B1 | 6/2004 | Yujen |
| 6,757,847 B1 | 6/2004 | Farkash et al. |
| 6,757,892 B1 * | 6/2004 | Gokhale et al. ............. 717/161 |
| 6,782,445 B1 | 8/2004 | Olgiati et al. |
| 6,785,826 B1 | 8/2004 | Durham et al. |
| 6,779,016 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 | 12/2004 | Davis et al. |
| 6,847,370 B2 | 1/2005 | Baldwin et al. |
| 6,868,476 B2 | 3/2005 | Rosenbluth et al. |
| 6,871,341 B1 * | 3/2005 | Shyr .......................... 717/131 |
| 6,874,108 B1 | 3/2005 | Abramovici et al. |
| 6,886,092 B1 | 4/2005 | Douglass et al. |
| 6,901,502 B2 | 5/2005 | Yano et al. |
| 6,928,523 B2 | 8/2005 | Yamada |
| 6,961,924 B2 | 11/2005 | Bates et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,687 B2 | 3/2006 | Vorbach et al. |
| 7,038,952 B1 | 5/2006 | Zack et al. |
| 7,210,129 B2 | 4/2007 | May et al. |
| 7,216,204 B2 | 5/2007 | Rosenbluth et al. |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,346,644 B1 | 3/2008 | Langhammer et al. |
| 7,350,178 B1 | 3/2008 | Crosland et al. |
| 2001/0001860 A1 | 5/2001 | Beiu |
| 2001/0010074 A1 | 7/2001 | Nishihara et al. |
| 2001/0018733 A1 | 8/2001 | Fujii et al. |
| 2001/0032305 A1 | 10/2001 | Barry |
| 2002/0013861 A1 | 1/2002 | Adiletta et al. |
| 2002/0038414 A1 | 3/2002 | Taylor et al. |
| 2002/0045952 A1 | 4/2002 | Blemel |
| 2002/0083308 A1 | 6/2002 | Pereira et al. |

| | | | |
|---|---|---|---|
| 2002/0103839 A1 | 8/2002 | Ozawa | |
| 2002/0124238 A1 | 9/2002 | Metzgen | |
| 2002/0138716 A1 | 9/2002 | Master et al. | |
| 2002/0143505 A1 | 10/2002 | Drusinsky | |
| 2002/0144229 A1 | 10/2002 | Hanrahan | |
| 2002/0165886 A1 | 11/2002 | Lam | |
| 2003/0001615 A1 | 1/2003 | Sueyoshi et al. | |
| 2003/0014743 A1* | 1/2003 | Cooke et al. | 717/161 |
| 2003/0046607 A1 | 3/2003 | Vorbach | |
| 2003/0052711 A1 | 3/2003 | Taylor et al. | |
| 2003/0055861 A1 | 3/2003 | Lai et al. | |
| 2003/0056085 A1 | 3/2003 | Vorbach | |
| 2003/0056091 A1 | 3/2003 | Greenberg | |
| 2003/0056202 A1 | 3/2003 | Vorbach | |
| 2003/0061542 A1 | 3/2003 | Bates et al. | |
| 2003/0062922 A1 | 4/2003 | Douglass et al. | |
| 2003/0086300 A1 | 5/2003 | Noyes et al. | |
| 2003/0093662 A1 | 5/2003 | Vorbach et al. | |
| 2003/0097513 A1 | 5/2003 | Vorbach et al. | |
| 2003/0123579 A1 | 7/2003 | Safavi et al. | |
| 2003/0135686 A1 | 7/2003 | Vorbach et al. | |
| 2003/0192032 A1 | 10/2003 | Andrade et al. | |
| 2004/0015899 A1 | 1/2004 | May et al. | |
| 2004/0025005 A1 | 2/2004 | Vorbach et al. | |
| 2004/0078548 A1 | 4/2004 | Claydon et al. | |
| 2004/0168099 A1 | 8/2004 | Vorbach et al. | |
| 2004/0199688 A1 | 10/2004 | Vorbach et al. | |
| 2005/0066213 A1 | 3/2005 | Vorbach et al. | |
| 2005/0144210 A1 | 6/2005 | Simkins et al. | |
| 2005/0144212 A1 | 6/2005 | Simkins et al. | |
| 2005/0144215 A1 | 6/2005 | Simkins et al. | |
| 2006/0230094 A1 | 10/2006 | Simkins et al. | |
| 2006/0230096 A1 | 10/2006 | Thendean et al. | |
| 2009/0085603 A1 | 4/2009 | Paul et al. | |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 12/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 735 685 | 10/1996 |
| EP | 0 835 685 | 10/1996 |
| EP | 0 746 106 | 12/1996 |
| EP | 0 748 051 | 12/1996 |
| EP | 0 735 685 | 4/1998 |
| EP | 0 726 532 | 7/1998 |
| EP | 0 926 594 | 6/1999 |
| EP | 1 102 674 | 7/1999 |
| EP | 1 061 439 | 12/2000 |
| EP | 1 102 674 | 5/2001 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 01-229378 | 9/1989 |
| JP | 2-130023 | 5/1990 |
| JP | 2-226423 | 9/1990 |
| JP | 5-276007 | 10/1993 |
| JP | 6-266605 | 9/1994 |
| JP | 07-086921 | 3/1995 |
| JP | 7-154242 | 6/1995 |
| JP | 8-148989 | 6/1995 |
| JP | 8-44581 | 2/1996 |
| JP | 08069447 A | 3/1996 |
| JP | 08-101761 | 4/1996 |
| JP | 8-102492 | 4/1996 |
| JP | 8-221164 | 8/1996 |
| JP | 8-250685 | 9/1996 |
| JP | 9-27745 | 1/1997 |
| JP | 09-294069 | 11/1997 |
| JP | 11-307725 | 11/1999 |
| JP | 2000-076066 | 3/2000 |
| JP | 2000-181566 | 6/2000 |
| JP | 2000201066 A | 7/2000 |
| JP | 2000-311156 | 11/2000 |
| JP | 2001-500682 | 1/2001 |
| JP | 05-509184 | 12/2003 |
| WO | WO90/04835 | 5/1990 |
| WO | WO90/11648 | 10/1990 |
| WO | WO92/01987 | 2/1992 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO 98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/035294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 5/2000 |
| WO | 2000/045282 | 8/2000 |
| WO | WO00/049496 | 8/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/050665 | 6/2002 |
| WO | WO02/071196 | 9/2002 |
| WO | WO02/71248 | 9/2002 |
| WO | WO02/71249 | 9/2002 |
| WO | WO02/103532 | 12/2002 |
| WO | WO03/17095 | 2/2003 |
| WO | WO03/23616 | 3/2003 |
| WO | WO03/025781 | 3/2003 |

| | | |
|---|---|---|
| WO | WO03/25781 | 3/2003 |
| WO | WO03/32975 | 4/2003 |
| WO | WO03/36507 | 5/2003 |
| WO | WO2004/053718 | 6/2004 |
| WO | WO2004/114128 | 12/2004 |
| WO | WO2005/045692 | 5/2005 |

OTHER PUBLICATIONS

Ade et al., "Minimum Memory Buffers in DSP Applications," Electronics Letters, vol. 30, No. 6, Mar. 17, 1994, pp. 469-471.
Villasenor, John et al., "Configurable Computing," *Scientific American*, Vol. 276, No. 6, Jun. 1997, pp. 66-71.
Villasenor, John et al., "Configurable Computing Solutions for Automatic Target Recognition," *IEEE*, 1996 pp. 70-79.
Tau, Edward et al., "A First Generation DPGA Implementation," FPD'95 pp. 138-143.
Athanas, Peter et al., "IEEE Symposium on FPGAs for Custom Computing Machines," *IEEE Computer Society Press*, Apr. 19-21, 1995, pp. i-vii, 1-222.
Bittner, Ray A. Jr., "Wormhole Run-time Reconfiguration: Conceptualization and VLSI Design of a High Performance Computing System," *Dissertation*, Jan. 23, 1997, pp. I-XX, 1-415.
Myers, G. "Advances in Computer Architecture," Wiley-Interscience Publication, 2nd ed., John Wiley & Sons, Inc. pp. 463-494, 1978.
M. Saleeba, "A Self-Contained Dynamically Reconfigurable Processor Architecture," Sixteenth Australian Computer Science Conference, ASCS-16, QLD, Australia, Feb. 1993.
M. Morris Mano, "Digital Design," by Prentice Hall, Inc., Englewood Cliffs, New Jersey 07632, 1984, pp. 119-125, 154-161.
Maxfield, C. "Logic that Mutates While-U-Wait" EDN (Bur. Ed) (USA), EDN (European Edition), Nov. 7, 1996, Cahners Publishing, USA.
Norman, Richard S., "Hyperchip Business Summary, The Opportunity," Jan. 31, 2000, pp. 1-3.
Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.
Weinhardt, Markus, Ubersetzingsmethoden fur strukturprogrammierbare rechner, Dissertation for Doktors der Ingenieurwissenschaften der Universitat Karlsruhe: Jul. 1, 1997.
Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.
K. Wada et al., "A Performance Evaluation of Tree-based Coherent Distributed Shared Memory" Proceedings of the Pacific RIM Conference on Communications, Comput and Signal Processing, Victoria, May 19-21, 1993.
Nilsson et al., "The Scalable Tree Protocol - A Cache Coherence Approaches for Large-Scale Multiprocessors" IEEE, pp. 498-506 Dec. 1992.
Wu et al., "A New Cache Directory Scheme", IEEE, pp. 466-472, Jun. 1996.
Hauck "The Roles of FPGA's in Reprogrammable Systems," IEEE, Apr. 1998, pp. 615-638.
Wittig et al., "OneChip: an FPGA Processor with Reconfigurable Logic" IEEE, 1996 pp. 126-135.
Cadambi et al., "Managing Pipeline-reconfigurable FPGAs," ACM, 1998, pp. 55-64.
Hong Yu Xu et al., "Parallel QR Factorization on a Block Data Flow Architecture" Conference Proceeding Article, Mar. 1, 1992, pp. 332-336 XP010255276, p. 333, Abstract 2.2, 2.3, 2.4-p. 334.
Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.
Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15th Annual International Symposium on Computer Architecture, May 30, 1988, pp. 252-260.
TMS320C54X DSP: CPU and Peripherals, Texas Instruments, 1996, pp. 6-26 to 6-46.
TMS320C54x DSP: Mnemonic Instruction Set, Texas Instruments, 1996, p. 4-64.
XLINX, "Logic Cell Array Families XC4000, XC4000A and XC4000H", product description, pp. 2-7 to 2-15, Additional XC3000, XC31000 and XC3400A Data pp. 8-16 and 9-14.
Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.
Forstner, Peter "Wer Zuerst Kommt, Mahlt Zuerst!: Teil 3: Einsatzgebiete und Anwendungsbeispiele von FIFO-Speichern", Elektronik, Aug. 2000, pp. 104-109.
John R. Hauser et al., "Garp: A MIPS Processor with a Reconfigurable Coprocessor", University of California, Berkeley, IEEE, 1997, pp. 12-21.
Jorg Donandt, "Improving Response Time of Programmable Logic Controllers by Use of a Boolean Coprocessor", AEG Research Institute Berlin, IEEE, 1989, pp. 4-167-4-169.
Alexandre F. Tenca et al., "A Variable Long-Precision Arithmetic Unit Design for Reconfigurable Coprocessor Architectures", University of California, Los Angeles, 1998, pp. 216-225.
Andreas Koch et al, "Practical Experiences with the SPARXIL Co-Processor", 1998, IEEE, pp. 394-398.
Athanas, Peter et al., An adaptive hardware machine architecture and compiler for dynamic processor reconfiguration, Brown University, 1991 *IEEE*, pp. 397-400.
Baumgarte, V., et al, PACT XPP—A self-reconfigurable data processing architecture, PACT Informationstechnologie GmbH, Munchen, Germany, 2001.
Jantsch, Axel et al, A case study on hardware/software partitioning, Royal Institute of Technology, Kista, Sweden, 1994 *IEEE*, pp. 111-118.
Becker, J. et al, Parallelization in co-compilation for configurable accelerators—A host/accelerator partitioning compilation method, *Proceedings of Asia and South Pacific Design Automation Conference*, Yokohama, Japan, Feb. 10-13, 1998.
Isshiki, Tsuyoshi, et al, Bit-serial pipeline synthesis for multi-FPGA systems with C++design capture, 1996 *IEEE*, pp. 38-47.
Dissertation for Doktors der Ingenieurwissenschaften der Universitat Karlsruhe: Weinhardt, Markus, Uberseizingsmethoden fur strukturprogrrunmierbare rechner, Jul. 1, 1997.
Hammes, Jeff, et al, Cameron: high level language compilation for reconfigurable systems, Department of Computer Science, Colorado State University, Conference on Parallel Architectures and Compilation Techniques, Oct. 12-16, 1999.
Abnous, A., et al., "The Pleiades Architecture," Chapter 1 of *The Application of Programmable DSPs in Mobile Communications*, A. Gatherer and A. Auslander, Ed., Wiley, 2002, pp. 1-33.
Alippi, et al., "Determining the Optimum Extended Instruction Set Architecture for Application Specific Reconfigurable VLIW CPUs," IEEE, 2001, pp. 50-56.
Arabi, et al.,"'PLD Integrates Dedicated High-speed Data Buffering, Complex State machine, and Fast Decode Array," conference record on VVESCON '93, Sep. 28, 1993, pp. 432-436.
Athanas, "A Functional Reconfigurable Architecture and Compiler for Adoptive Computing," IEEE, pp. 49-55.
Beck et al., "From control flow to data flow," TR 89-1050, Oct. 1989, Dept. of Computer Science, Cornell University, Ithaca, NY, pp. 1-25.
Callahan, et al., "The Garp Architecture and C Compiler," Computer, Apr. 2000, pp. 62-69.
Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.
DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Diniz, P., et al., "Automatic Synthesis of Data Storage and Control Structures for FPGA-based Computing Engines," 2000, IEEE, pp. 91-100.

Dutt, et al., "If Software is King for Systems-in-Silicon, What's New in Compiler?," IEEE, 1997, pp. 322-325.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fomaciari, et al., System-level power evaluation metrics, 1997 Proceedings of the 2nd Annual IEEE International Conference on Innovative Systems in Silicon, New York, NY, Oct. 1997, pp. 323-330.

Gokhale, M.B.et al., "Automatic Allocation of Arrays to Memories in FPGA processors with Multiple Memory Banks," Field-Programmable Custom Computing Machines, 1999, IEEE, pp. 63-67.

Hartenstein, R., "Coarse grain reconfigurable architectures," Design Automation Conference, 2001, Proceedings of the ASP-DAC 2001 Asia and South Pacific, Jan. 30- Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hedge, S.J., "3D WASP Devices for On-line Signal and Data Processing," 1994, International Conference on Wafer Scale Integration, pp. 11-21.

Iseli, C., et al. "A C++Compiler for FPGA Custom Execution Units Synthesis," IEEE, 1995, pp. 173-179.

Jacob, J., et al., "Memory Interfacing and Instruction Specification for Reconfigurable Processors," ACM 1999, pp. 145-154.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Ling, X., "WASMII: and MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Piotrowski, A., "IEC-BUS, Die Funktionsweise des IEC-Bus unde seine Anwendung in Geraten und Systemen," 1987, Franzis-Verlag GmbH, München, pp. 20-25.

Razdan et al., A High-Performance Microarchitecure with Hardware-Programmable Functional Units, Micro-27, Proceedings of the 27th Annual International Symposium on Microarchitecture, IEEE Computer Society and Association for Computing Machinery, Nov. 30- Dec. 2, 1994, pp. 172-180.

Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.

Shirazi, et al., "Quantitative analysis of floating point arithmetic on FPGA based custom computing machines," IEEE Symposium on FPGAs for Custom Computing Machines, IEEE Computer Society Press, Apr. 19-21, 1995, pp. 155-162.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13th International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

The XPP. White Paper, Release 2.1, PACT—A Technical Perspective, Mar. 27, 2002, pp. 1-27.

Villasenor, et a)., "Express Letters Vidco Communications Using Rapidly Reconfigurable Hardware," IEEE Transactions on Circuits and Systems for Video Technology, IEEE, Inc., NY, Dec. 1995, pp. 565-567.

Weinhardt, Markus et al., "Pipeline Vectorization for Reconfigurable Systems," 1999, IEEE, pp. 52-62.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization," IEEE Transactions on Computer-Aided Design of Integrated Circuits and Systems, vol. 20, No. 2, Feb. 2001, pp. 234-248.

Ye, Z.A., et al., "A Compiler for a Processor With a Reconfigurable Functional Unit," FPGA 2000 ACM/SIGNA International Symposium on Field Programmable Gate Arrays, Monterey, CA Feb 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang et al., Architectural Evaluation of Flexible Digital Signal Processing for Wireless Receivers, Signals, Systems and Computers, 2000; Conference Record of the Thirty-Fourth Asilomar Conference, Bd. 1,Oct. 29, 2000, pp. 78-83.

U.S. Appl. No. 60/109,417, filed Nov. 18, 1998, Jefferson et al.

Albahama, O.T. et al., "On the Viability of FPGA-Based Integrated Coprocessors," Dept. of Electrical and Electronic Engineering, Imperial College of Science, London, 1999 IEEE, pp. 206-215.

Athanas et al., "Processor Reconfiguration Through Instruction-Set Metamorphosis," 1993, IEEE Computers, pp. 11-18.

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, Joao M.P. And Markus Weinhardt, "XPP-VC: A C Compiler with Temporal Partitioning for the PACT-XPP Architecture," Field- Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.

Compton, K. et al., "Configurable Computing: A Survey of Systems and Software," Northwestern University, Dept. Of ECE, Technical Report, 1999, (XP-002315148), 39 pages.

Franklin, Manoj et al., "A Fill-Unit Approach to Multiple Instruction Issue," Proceedings of the Annual International Symposium on Microarchitecture, Nov. 1994, pp. 162-171.

Hwang, K., "Advanced Computer Architecture—Parallelism, Scalability, Programmability," 1993, McGraw-Hill, Inc., pp. 348-355.

IBM Technical Disclosure Bulletin, IBM Corp., New York, XP000424878, Bd. 36, Nr. 11, Nov. 1, 1993, pp. 335-336.

Knittel, Gunter, "A PCI-compatible FPGA-Coprocessor for 2D/3D Image Processing," University of Turgingen, Germany, 1996 IEEE, pp. 136-145.

Koren et al., "A data-driven VLSI array for arbitrary algorithms," IEEE Computer Society, Long Beach, CA vol. 21, No. 10, Oct. 1, 1988, pp. 30-34.

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOCC) [online] Oct. 25, 2004, Seoul, Korea, 5 pages.

Margolus, N., "An FPGA architecture for DRAM-based systolic computations," Boston University Center for Computational Science and MIT Artificial Intelligence Laboratory, IEEE 1997, pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Tsutsui, A., et al., "Yards: FPGA/MPU Hybrid Architecture for Telecommunication Data Processing," NTT Optical Network Systems Laboratories, Japan, 1997 ACM, pp. 93-99.

XILINX, "Spartan and SpartanXL Families Field Programmable Gate Arrays," Jan. 1999, Xilinx, pp. 4-3 through 4-70.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Abnous, A. et al., "Ultra-Low-Power Domain-Specific Multimedia Processors," U.C. Berkeley, 1996 IEEE, pp. 461-470.

Sutton et al., "A Multiprocessor DSP System Using PADDI-2," U.C. Berkeley, 1998 ACM, pp. 62-65.

Zhang, et al., "Abstract: Low-Power Heterogeneous Reconfigurable Digital Signal Processors with Energy-Efficient Interconnect Network," U.C. Berkeley, pp. 1-120.

Asari, et al., "FeRAM circuit technology for system on a chip," Proceedings First NASA/DoD Workshop on Evolvable Hardware, pp. 193-197 (1999).

Lee, et al., "Multimedia extensions for general-purpose processors," IEEE Workshop on Signal Processing Systems, SIPS 97—Design and Implementation, pp. 9-23 (1997).

Pirsch, et al., "VLSI implementations of image and video multimedia processing systems," IEEE Transactions on Circuits and Systems for Video Technology 8(7): 878-891 (Nov. 1998).

Salefski, et al., "Re-configurable computing in wireless," Annual ACM IEEE Design Automation Conference: Proceedings of the 38th conference on Design automation, pp. 178-183 (2001).

Schmidt, et al., "Datawave: A Single-Chip Multiprocessor for Video Applications," IEEE Micro11(3): 22-25 and 88-94 (Jun. 1991).

Cardoso, et al., "Compilation and Temporal Partitioning for a Coarse-Grain Reconfigurable Architecture", Lysacht, P. & Rosentiel, W. eds., "New Algorithms, Architectures and Applications for Reconfigurable Computing," pp. 105-115 (2005).

Cardoso, et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, pp. 2-11(Apr. 21, 1999).

Cook, "The Amalgam Compiler Infrastructure," Thesis at the University of Illinois at Urbana-Champaign Chapter 7 & Appendix G (2004).

Fawcett, "Map, Place and Route: The Key to High-Density PLD Implementation," Wescon Conference, IEEE Center, pp. 292-297 (Nov. 7, 1995).

Hendrich, et al., "Silicon Compilation and Rapid Prototyping of Microprogrammed VLSI-Circuits with MIMOLA and SOLO 1400," Microprocessing & Microprogramming 35(1-5): 287-294 (Sep. 1992).

Koch, et al., "High-Level-Language Compilation for Reconfigurable Computers," Proceedings of European Workshop on Reconfigurable Communication-Centric SOCS, 8 pages (Jun. 2005).

Moraes, et al., "A Physical Synthesis Design Flow Based on Virtual Components," XV Conference on Design of Circuits and Integrated Systems, 6 pages (Nov. 2000).

Neumann, et al., "A Generic Library for Adaptive Computing Environments," Field Programmable Logic and Applications, 11th International Conference, FPL 2001, Proceedings (Lecture Notes in Computer Science, vol. 2147), pp. 503-512 (2001).

Schönfeld, et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology 11(1/2): 51-74 (Oct.1, 1995).

Shin, et al., "C-based Interactive RTL Design Methodology," Technical Report CECS-03-42, pp. 1-16 (Dec. 2003).

Sondervan, "Retiming and logic synthesis," Electronic Engineering 65(793): 33, 35-36 (Jan. 1993).

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," XILINX, Inc., Section 2, pp. 1-240, Section 8, pp. 1, 23-25, 29, 45-52, 169-172 (1994).

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT4OK FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4)325-420 (1994).

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators." 1998, Proc. 31st Annual Hawaii International Conference on System Sciences, pp. 169-178.

Cardoso, J.M.P. et al., "A novel algorithm combining temporal partitioning and sharing of functional units," University of Algarve, Faro, Portugal, 2001 IEEE, pp. 1-10.

Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on NAPA Valley, CA, USA, Apr. 21-23, 1999, IEEE Comput. Soc, US, (Apr. 21, 1999) pp. 2-11.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Cook, Jeffrey J., "The Amalgam Compiler Infrastructure," Thesis at the University of Illinois at Urbana-Champaign (2004) Chapter 7 & Appendix G.

Cronquist, D. et al., 'Architecture Design of Reconfigurable Pipelined Datapaths, Department of Computer Science and Engineering, University of Washington, Seattle, WA, Proceedings of the 20th Anniversary Conference on Advanced Research in VSLI, 1999, pp. 1-15.
DeHon, Andre, "Reconfigurable Architectures for General-Purpose Computing," Massachusetts Institute of Technology, Technical Report AITR-1586, Oct. 1996, XP002445054, Cambridge, MA, pp. 1-353.
Diniz, P., et al., "A behavioral synthesis estimation interface for configurable computing," University of Southern California, Marina Del Rey, CA, 2001 IEEE, pp. 1-2.
Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.
Equator, Pixels to Packets, Enabling Multi-Format High Definition Video, Equator Technologies BSP-15 Product Brief, www.equator.com, 2001, 4 pages.
Fawcett, B.K., "Map, Place and Route: The Key to High-Density PLD Implementation," Wescon Conference, IEEE Center (Nov. 7, 1995) pp. 292-297.
Freescale Slide Presentation, An Introduction to Motorola's RCF (Reconfigurable Compute Fabric) Technology, Presented by Frank David, Launched by Freescale Semiconductor, Inc., 2004, 39 pages.
Genius, D. et al., "A Case for Array Merging in Memory Hierarchies," Proceedings of the 9th International Workshop on Compilers for Parallel Computers, CPC'01 (Jun. 2001), 10 pages.
Hartenstein, R. et al., "A new FPGA architecture for word-oriented datapaths," Proc. FPL'94, Springer LNCS, Sep. 1994, pp. 144-155.
Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.
Hwang, K., "Computer Architecture and Parallel Processing," Data Flow Computers and VLSI Computations, XP-002418655, 1985 McGraw-Hill, Chapter 10, pp. 732-807.
Inside DSP, "Ambric Discloses Massively Parallel Architecture," Aug. 23, 2006, HTTP://insidedsp.com/tabid/64/articleType/ArticleView/articleld/155/Defa..., 2 pages.
Intel, Intel MXP5800/MXP5400 Digital Media Processors, Architecture Overview, Jun. 2004, Revision 2.4, pp. 1-24.
Kaul, M., et al., "An automated temporal partitioning and loop fission approach of FPGA based reconfigurable synthesis of DSP applications," University of Cincinnati, Cincinnati, OH, ACM 1999, pp. 616-622.
Kean, T.A., "Configurable Logic: A Dynamically Programmable Cellular Architecture and its VLSI Implementation," University of Edinburgh (Dissertation) 1988, pp. 1-286.
Kean, T., et al., "A Fast Constant Coefficient Multiplier for the XC6200," Xilinx, Inc., Lecture Notes in Computer Science, vol. 1142, Proceedings of the 6th International Workshop of Field-Programmable Logic, 1996, 7 pages.
Kim et al., "A Reconfigurable Multifunction Computing Cache Architecture," IEEE Transactions on Very Large Scale Integration (VLSI) Systems vol. 9, Issue 4, Aug 2001 pp. 509-523.
Koch, Andreas et al., "High-Level-Language Compilation for Reconfigurable Computers," Proceedings of European Workshop on Reconfigurable Communication-Centric SOCS (Jun. 2005) 8 pages.
Larsen, S. et al., "Increasing and Detecting Memory Address Congruence," Proceedings of the 2002 IEEE International Conference on Parallel Architectures and Compilation Techniques (PACT'02), pp. 1-12 (Sep. 2002).
Mei, Bingfeng, "A Coarse-Grained Reconfigurable Architecture Template and Its Compilation Techniques," Katholeike Universiteit Leuven, PhD Thesis, Jan. 2005, IMEC vzw, Universitair Micro-Electronica Centrum, Belgium, pp. 1-195 (and Table of Contents).
Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_O1_design.pdf.
Miyamori, T. et al., "REMARC: Reconfigurable Multimedia Array Coprocessor," Computer Systems Laboratory, Stanford University, IEICE Transactions on Information and Systems E Series D, 1999;

(abstract): Proceedings of the 1998 ACM/SIGDA sixth international symposium on Field programmable gate arrays, p. 261, Feb. 22-25, 1998, Monterey, California, United States, pp. 1- 12.
Moraes, F., et al., "A Physical Synthesis Design Flow Based on Virtual Components," XV Conference on Design of Circuits and Integrated Systems (Nov. 2000) 6 pages.
Muchnick, S., "Advanced Compiler Design and Implementation" (Morgan Kaufmann 1997), Table of Contents, 11 pages.
Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.
Nageldinger, U., "Design-Space Exploration for Coarse Grained Reconfigurable Architectures," (Dissertation) Universitaet Kaiserslautern, 2000, Chapter 2, pp. 19-45.
Neumann, T., et al., "A Generic Library for Adaptive Computing Environments," Field Programmable Logic and Applications, 11th International Conference, FPL 2001, Proceedings (Lecture Notes in Computer Science, vol. 2147) (2001) pp. 503-512.
Olukotun, K., "The Case for a Single-Chip Microprocessor," ACM Sigplan Notices, ACM, Association for Computing Machinery, New York, vol. 31, No. 9, Sep. 1996 pp. 2-11.
PACT Corporation, "The XPP Communication System," Technical Report 15 (2000), pp. 1-16.
Parhami, B., "Parallel Counters for Signed Binary Signals," Signals, Systems and Computers, 1989, Twenty-Third Asilomar Conference, vol. 1, pp. 513-516.
Saleeba, Z.M.G., "A Self-Reconfiguring Computer System," Department of Computer Science, Monash University (Dissertation) 1998, pp. 1-306.
Schmidt, H. et al., "Behavioral synthesis for FGPA-based computing," Carnegie Mellon University, Pittsburgh, PA, 1994 IEEE, pp. 125-132.
Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 2005) vol. 11(1/2), pp. 51-74.
Shin, D., et al., "C-based Interactive RTL Design Methodology," Technical Report CECS-03-42 (Dec. 2003) pp. 1-16.
Siemers, C.,"Rechenfabrik Ansaetze Fuer Extrem Parallele Prozessoren," Verlag Heinze Heise GmbH., Hannover, DE No. 15, Jul. 16, 2001, pp. 170-179.
Singh, H. et al., "MorphoSys: an Integrated Reconfigurable System for Data-Parallel Computation-Intensive Applications," University of California, Irvine, CA. And Federal University of Rio de Janeiro, Brazil, 2000, IEEE Transactions on Computers, pp. 1-35.
Sondervan, J., "Retiming and logic synthesis," Electronic Engineering (Jan. 1993) vol. 65(793), pp. 33, 35-36.
Soni, M., "VLSI Implementation of a Wormhole Run-time Reconfigurable Processor," Jun. 2001, (Masters Thesis)Virginia Polytechnic Institute and State University, 88 pages.
Vasell et al., "The Function Processor: A Data-Driven Processor Array for Irregular Computations," Chalmers University of Technology, Sweden, pp. 1-21.
Waingold, E., et al., "Baring it all to software: Raw machines," IEEE Computer, Sep. 1997, at 86-93.
Weinhardt, Markus et al., "Memory Access Optimization for Reconfigurable Systems," IEEE Proceedings Computers and Digital Techniques, 48(3) (May 2001) pp. 1-16.
Wolfe, M. et al., "High Performance Compilers for Parallel Computing" (Addison-Wesley 1996) Table of Contents, 11 pages.
XILINX, "XC6200 Field Programmable Gate Arrays," Apr. 24, 1997, Xilinx product description, pp. 1-73.
XILINX, "XC3000 Series Field Programmable Gate Arrays," Nov. 6, 1998, Xilinx product description, pp. 1-76.
XILINX, "XC4000E and XC4000X Series Field Programmable Gate Arrays," May 14, 1999, Xilinx product description, pp. 1-68.
XILINX, "Virtex-E 1.8 V Extended Memory Field Programmable Gate Arrays," Jul. 17, 2002, Xilinx Production Product Specification, pp. 1-118.
XILINX, "Virtex-II and Virtex-II Pro X FPGA User Guide," Mar. 28, 2007, Xilinx user guide, pp. 1-559.

Zima, H. et al., "Supercompilers for parallel and vector computers" (Addison-Wesley 1991) Table of Contents, 5 pages.

Abnous, A. et al., "Ultra-Low-Power Domain-Specific Multimedia Processors," U.C. Berkeley, 1996 IEEE, pp. 461-470.

Sutton et al., "A Multiprocessor DSP System Using PADDI-2," U.C. Berkeley, 1998 ACM, pp. 62-65.

Zhang, et al., "Abstract: Low-Power Heterogeneous Reconfigurable Digital Signal Processors with Energy-Efficient Interconnect Network," U.C. Berkeley, pp. 1-120. 2004.

Ohmsha, "Information Processing Handbook," edited by the Information Processing Society of Japan, pp. 376, Dec. 21, 1998.

Jantsch, Axel et al., "Hardware/Software Partitioning and Minimizing Memory Interface Traffic," Electronic System Design Laboratory, Royal Institute of Technology, ESDLab, Electrum 229, S-16440 Kista, Sweden (Apr. 1994), pp. 226-231.

Mei, Bingfeng et al., "Adres: an Architecture with Tightly Coupled Vliw Processor and Coarse-Grained Reconfigurable Matrix," Proc. *Field-Programmable Logic and Applications* (FPL 03), Springer, 2003, pp. 61-70.

\* cited by examiner

METHOD FOR PROCESSING DATA

FIELD OF THE INVENTION

The present invention relates to data processing. In particular, the present invention relates to traditional, i.e., conventional and reconfigurable processor architectures as well as methods therefor, which permit translation of a classical high-level language (PROGRAM) such as Pascal, C, C++, Java, etc., in particular onto a reconfigurable architecture. The present invention relates in particular to integration and/or close coupling of reconfigurable processors with standard processors, data exchange, and synchronization of data processing.

BACKGROUND INFORMATION

A conventional processor architecture (PROCESSOR) is understood in the present case to refer to sequential processors having a von Neumann architecture or a Harvard architecture, such as controllers or CISC processors, RISC processors, VLIW processors, DSP processors, etc.

The term "reconfigurable target architecture" is understood in the present case to refer to modules (VPUs) having a function and/or interconnection that is repeatedly configurable, in particular configurable without interruption during run time, in particular integrated modules having a plurality of one-dimensionally or multidimensionally arranged arithmetic and/or logic and/or analog and/or memory modules, in particular also coarse-grained modules (PAEs) which are interlinked directly or via a bus system.

The generic class of such modules includes in particular systolic arrays, neural networks, multiprocessor systems, processors having a plurality of arithmetic units and/or logic cells, interlinking and network modules such as crossbar switches as well as known modules of the generic types FPGA, DPGA and XPUTER, etc. In this connection, reference is made in particular to the following patents and patent applications: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, DE 196 51 075.9-53, DE 196 54 846.2-53, DE 196 54 593.5-53, DE 197 04 728.9, DE 197 07 872.2, DE 101 39 170.6, DE 199 26 538.0, DE 101 42 904.5, DE 101 10 530.4. These are herewith incorporated to the full extent for disclosure purposes.

This system may be designed in particular as a (standard) processor or module and/or may be integrated into a semiconductor (system on chip, SoC).

Reconfigurable modules (VPUs) of different generic types (such as PACT XPP technology, Morphics, Morphosys, Chameleon) are largely incompatible with existing technical environments and programming methods.

Programs for these modules are typically incompatible with existing programs of CPUs. A considerable development expense is thus necessary for programming, e.g., in particular for modules of the generic types Morphics, Morphosys. Chameleon already integrates a standard processor (ARC) on more or less reconfigurable modules. This makes approaches for programming tools available. However, not all technical environments are suitable for the use of ARC processors; in particular there are often existing programs, code libraries, etc. for any indeterminate other CPUs.

In internal experiments it has been found that there are certain methods and program sequences which may be processed better using a reconfigurable architecture rather than a conventional processor architecture. Conversely, there are also such methods and program sequences which are better executed using a conventional processor architecture. It would be desirable to provide a sequence partitioning to permit appropriate optimization.

Conventional translation methods for reconfigurable architectures do not support any forwarding of codes to any standard compilers for generating object codes for any desired PROCESSOR. Ordinarily, the PROCESSOR is fixedly defined within the compiler.

In addition, there are no scheduling mechanisms for reconfiguring the individual configurations generated for VPUs. In particular there are no scheduling mechanisms for configuration of independently extracted portions or for individual partitions of extracted portions. Conventional corresponding translation methods are described in the dissertation *Übersetzungsmethoden für strukturprogrammierbare Rechner [Translation Methods for Structure Programmable Computers]*, by Dr. Markus Weinhardt, 1997, for example.

Several conventional methods are known for partitioning array CODE, e.g., João M. P. Cardoso, *Compilation of Java™ Algorithms onto Reconfigurable Computing Systems with Exploitation of Operation-Level Parallelism*, Ph.D. dissertation, Universidade Técnica de Lisboa (UTL), 2000.

However, these methods are not embedded into any complete compiler systems. Furthermore, these methods presuppose complete control of the reconfiguration by a host processor, which involves considerable complexity. The partitioning strategies are designed for FPGA-based systems and therefore do not correspond to any actual processor model.

SUMMARY

An object of the present invention is to provide a method for a commercial application.

A reconfigurable processor (VPU) is thus designed into a technical environment which has a standard processor (CPU) such as a DSP, RISC, CISC processor or a (micro)controller. The design may be accomplished according to an embodiment of the present invention in such a way that there is a simple and efficient connection. One resulting aspect is the simple programmability of the resulting system. Further use of existing programs of the CPU as well as the code compatibility and simple integration of the VPU into existing programs are taken into account.

A VPU (or a plurality of VPUs, although this need not be mentioned specifically each time) is coupled to a preferred CPU (or a plurality of CPUs, although this need not be mentioned specifically each time) so that it assumes the position and function of a coprocessor (or a plurality of coprocessors that respond optionally). This function permits a simple tie-in into existing program codes according to the pre-existing methods for working with coprocessors according to the related art.

The data exchange between the CPU and VPU according to the present invention may be accomplished by memory coupling and/or IO coupling. The CPU and VPU may share all resources; in particular embodiments, it is also possible for the CPU and VPU to jointly use only a portion of the resources and to make other resources available explicitly and/or exclusively for a CPU or VPU.

To perform a data exchange, data records and/or configurations may be copied and/or written/read in memory areas particularly provided for those purposes and/or corresponding basic addresses may be set in such a way that these point to the particular data areas.

To control the coprocessor, preferably a data record which contains the basic settings of a VPU, e.g., certain basic addresses are provided, for example. In addition, status variables may also be provided for triggering and for function control of a VPU by a CPU and for acknowledgments from a VPU to a CPU. This data record may be exchanged via a shared memory (RAM) and/or via a shared peripheral address space (IO).

For synchronization of the CPU and VPU, unilaterally or mutually acting interrupt methods (which are implemented, for example, by signal transfer over interrupt lines and/or interrupt inputs that are specifically dedicated and/or designed for this purpose) and/or the synchronization is accomplished by polling methods. Furthermore, interrupts may also be used for synchronization of data transfers and/or DMA transfers.

In an example embodiment that is particularly preferred, a VPU is started by a CPU and thereafter operates preferably independently of the application.

A preferred design in which the VPU provides its own mechanisms for loading and controlling configurations is particularly efficient. The generic type of these VPUs include, for example, PACT XPP and Chameleon. The circuits according to the present invention permit a method of operation in which the configurations of the VPU are loaded into a memory together with the program to be executed by the CPU. During execution of the program, the CPU may refer the VPU to the memory locations (e.g., by giving the addresses or pointers), each containing configurations to be executed. The VPU may then load the configurations independently and without further influence by the CPU. The execution by the CPU starts immediately or optionally by means of additional information (e.g., interrupt and/or start instruction).

In a particularly preferred expansion, the VPU may read and write data independently within a memory.

In a particularly preferred expansion, the VPU may also independently load new configurations out of the memory and may perform new configurations as needed without requiring any further influence by the CPU.

These embodiments permit extensive operation of VPUs independently of CPUs. Only a synchronization exchange between CPU and VPU, which may preferably take place bidirectionally, is provided in addition to coordinate data processing operations and/or executions of configurations.

It has also been recognized that methods of data processing may and/or should preferably be designed so that particularly suitable portions (VPU code) of the program to be translated are identified and extracted for the reconfigurable target architecture (VPU) to permit particularly efficient data processing. These portions are to be partitioned accordingly and the time sequence configuration of the individual partitions is to be controlled.

The remaining portions of the program may be translated onto a conventional processor architecture (PROCESSOR). This is preferably accomplished in such a way that these portions are output as high-level language code in a standard high-level language (e.g., ANSI C) so that an ordinary high-level language compiler (optionally pre-existing) is able to process it without difficulty.

It should also be pointed out that these methods may also be used for groups of a plurality of modules.

In particular a type of "double buffering" may be used for a particularly simple and at the same time rapid reconfiguration in which a plurality of VPUs are provided, so that a portion of the VPUs may be reconfigured at a time when another portion is computing and perhaps yet another may be inactive, for example. Data links, trigger links, status links, etc. are exchanged among a plurality of VPUs in a suitable way, and are optionally wired through addressed buses and/or multiplexers/demultiplexers according to the VPUs that are currently active and/or to be reconfigured.

One advantage of this method is that existing code which has been written for any processor, may continue to be used by involving a VPU, and no modifications or only comparatively minor modifications need be made. The modifications may also be performed incrementally, with more code being transferred gradually from the processor to the VPU. The project risk drops, and there is a significant increase in clarity. It should be pointed out that such a successive transfer of more and more tasks to the VPU, i.e., to the integral, multi-dimensional, partially reconfigurable and in particular coarse-grained field of elements, has a special meaning on its own and is regarded as being inventive per se because of its major advantages in system porting.

In addition, the programmer is able to work in his/her accustomed development environment and need not become adjusted to a novel and possibly foreign development environment.

A first aspect of the present invention may be seen in the fact that a PROCESSOR is connected to one or more VPUs so that an efficient exchange of information is possible, in particular in the form of data information and status information.

Importance may also be attributed to the configuration of a conventional processor and a reconfigurable processor so that exchange of data information and/or status information between same is possible during running of one or more programs and/or without having to significantly interrupt data processing on the reconfigurable processor and/or the conventional processor in particular; importance may also be attributed to the design of such a system.

For example, one or all of the following linking methods and/or means may be used:
a) shared memory,
b) network (e.g., bus systems such as PCI bus, serial buses such as Ethernet, for example),
c) connection to an internal register set or a plurality of internal register sets,
d) other memory media (hard drive, flash ROM, etc.).

In principle, the VPU and/or the CPU may also independently access the memory without the assistance of a DMA. The shared memory may also be designed as a dual port memory or a multiport memory in particular. Additional modules may be assigned to the system, and in particular reconfigurable FPGAs may be used to permit fine-grained processing of individual signals or data bits and/or to make it possible to establish flexible adaptable interfaces (e.g., various serial interfaces (V24, USB, etc.), various parallel interfaces, hard drive interfaces, Ethernet, telecommunications interfaces (a/b, T0, ISDN, DSL, etc.)).

The structure of a VPU is known, for example, from the patents and patent applications described above. Attempts to arrive at alternative module definitions have become known under the name Chameleon, for example. VPUs may be integrated into a system in various ways. For example, a connection to a host processor is possible. Depending on the method, the host processor may assume the configuration control (HOSTRECONF) (e.g., Chameleon) or there may be, for example, a dedicated unit (CT) for controlling the (re)configuration.

Accordingly, the translator according to the method described here generates the control information for the reconfiguration for a CT and/or a HOSTRECONF.

The translation principle may be embodied in such a way that by using a preprocessor, the portions that may be mapped efficiently and/or reasonably on the particular certain VPU(s) may be extracted from a PROGRAM via a PREPROCESSOR. These portions are transformed into a format suitable for VPUs (NML) and are then translated further into an object code.

The remaining code and/or the extracted code is expanded according to experience at or with respect to the location of the code portions that are missing due to the extraction, by adding an interface code which controls communication between PROCESSOR(s) and VPU(s) according to the architecture of the target system. The remaining code which has been optionally expanded may preferably be extracted. This may take place as follows, for example:

```
...
Code
...
# START_EXTRACTION
Code to be extracted
# END_EXTRACTION
...
Code
...
"// START_EXTRACTION" denotes the start of a code to be extracted.
"// END_EXTRACTION" denotes the end of a code to be extracted.
```

In such a case, the unit for implementation of the program in configuration codes is designed to recognize the hints and/or implementation instructions.

It is also possible for portions of the PROGRAM to be implemented directly in NML for extraction by calling NML routines and to jump to the NML routines using calls. This may take place as follows, for example:

```
a)   NML code
     ...
     procedure EXAMPLE
     begin
     ...
     end
     ...
b)   PROGRAM code
     ...
     Code
     ...
     call EXAMPLE        // call of the NML code
     ...
     Code
     ...
```

In this case, the unit for implementation is designed to tie NML program portions, i.e., program portions for execution in and/or on a reconfigurable array, into a larger program.

Alternatively and/or additionally, extraction from an object-oriented class is also possible. Macros suitable for a VPU are defined as a class in the class hierarchy of an object-oriented programming language. The macros may be characterized by annotation so that they are recognized as codes intended for a VPU and are processed further accordingly—even in higher hierarchies of the language.

Within a macro, a certain networking and/or mapping is preferably predetermined by the macro which then determines the mapping of the macro onto the VPU.

Instantiation and chaining of the class results in implementation of the function which includes a plurality of macros on the VPU. In other words, instantiation and chaining of macros define the mapping and interconnection of the individual operations of all macros on the VPU and/or the interconnection and/or data exchange between the VPU and CPU, if necessary.

The interface codes are added in instantiation. Chaining describes the detailed mapping of the class on the VPU.

A class may also be formed as a call of one or more NML routines, for example.

```
a)   Class code
     ...
     class EXAMPLE
     begin
     ...
     end
     ...
b)   PROGRAM code
     ...
     Code
     ...
     EXAMPLE var( )       // instantiation of the class
     ...
     Code
     ...
```

Extraction by analysis is also possible. Portions within the PROGRAM which may be mapped efficiently and/or appropriately on the VPU are recognized using the analytical methods adapted to the particular VPU.

These portions are extracted from the PROGRAM.

An analytical method suitable for many VPUs, for example, is to create data flow graphs and/or control flow graphs from the PROGRAM. These graphs may then be analyzed automatically with regard to their possible partitioning and/or mapping onto the target VPU. In this case, the portions of the graphs generated and/or the corresponding PROGRAM PORTIONS, which may be partitioned and/or mapped sufficiently well, are extracted. To do so, a partition-ability and/or mappability analysis may be performed, evaluating the particular property. Partitioning and extraction of the program portions on the VPU as well as the introduction of the interfaces provided are then performed according to this evaluation.

Reference is made here explicitly to the analytical methods described in German Patent Application DE 101 39 170.6 which may be used, for example. The aforementioned patent application is herewith incorporated to full extent for disclosure purposes.

One possible analytical method is also provided by recognition of certain data types.

Different data types are more or less suitable for processing on a VPU. For example, complex pointer arithmetics, i.e., pointer-based data addressing (pointer) is difficult to map onto a VPU, whereas arrays are very easily mappable.

Therefore, the particular suitable data types and at least essential portions of their data processing may be transferred largely automatically or manually to a VPU according to the present invention and extracted accordingly. The extraction is performed in response to the occurrence of certain data types and/or data operations.

It should be pointed out here that additional parameters assigned to the data types may provide additional information for determining the executability and/or execution performance on a VPU and therefore may also be used to a significant extent for extraction. For example, the size of the arrays to be computed plays a significant role. It is usually not worthwhile to perform computations for small arrays on a VPU because the resources needed for synchronization and data exchange between the CPU and VPU may be excessive. However, it should again be pointed out that small arrays for which computations are performed particularly frequently within a loop are nevertheless very suitable for VPUs if the loop is computed almost completely on the VPU. Large arrays, however, may usually be computed particularly efficiently on a VPU.

In addition, it should be pointed out that certain data types may be created by a specially adapted compiler or, optionally, by a user (e.g., by using TYPE in Pascal), these being particularly suitable for VPUs and data processing of which is then executed on a VPU.

For example, there may be the following data types:

TYPE stream1 of byte [ ];

TYPE stream2 of byte [0 . . . 255;

The term "stream" defines a data stream usually of a great, possibly not previously known, and/or infinite, length. Stream1 here had a length that was not previously known. For example, an FIR filter programmed with this type of data (or, for example, an FFT or DCT) could be mapped automatically onto a VPU—and optionally rolled out. The reconfiguration is then typically and preferably performed in response to other mechanisms than the data stream, e.g., by counters, comparators, CT-controlled and/or by timeout. For example, if wave configuration or some other reconfiguration is to be triggered here, then this characterization of a data packet, in particular data bytes, prompted via conventional methods may be the last to take place to trigger the reconfiguration after and/or with the run-through of this data packet, which is characterized as the last data packet.

stream2 defines a data stream having the length of 256 bytes here, which may be treated like stream1, but has the property of ending after 256 bytes and thus possibly triggering a reconfiguration after the end in the sense of the patents cited above by the same applicant. In particular a wave reconfiguration, e.g., according to DE 197 04 728.9, DE 199 26 538.0, DE 102 06 857.7, DE 100 28 397.7) may be triggered with the occurrence of the last data byte and the particular PAE processing the byte may be reconfigured with the processing of this last data byte.

A translation of the extracted code according to NML which is suitable for the implemented VPU may preferably be performed.

For data flow-oriented VPUs, a data flow graph and/or a control flow graph may be created automatically, for example. The graphs are then translated into NML code.

Corresponding code portions such as loops may then be translated via a database (lookup) or ordinary transformations may be performed. For code portions, macros may also be provided and are then used further according to the IKR disclosed in the aforementioned patent applications.

Modularization according to PACT13 (PCT/DE00/01869), FIG. 28 may also be supported.

Optionally, the mapping and/or its preparation may already take place on the VPU, e.g., by performing the placement of the required resources and routing the connections (place and route). This may be done, for example, according to the conventional rules of placement and routing.

It is also possible to analyze the extracted code and/or the translated NML code for its processing efficiency by using an automatic analytical method. The analytical method is preferably selected so that the interface code and the performance influences derived from it are also included in the analysis at a suitable point. Suitable analytical methods are described, for example, in the patent applications by the present patent applicant as cited above.

The analysis is optionally performed via complete translation and implementation on the hardware system by executing the PROGRAM and performing measurements using suitable conventional methods.

It is also possible that, based on the analyses performed, various portions that have been selected for a VPU by extraction might be identified as unsuitable. Conversely, the analysis may reveal that certain portions that have been extracted for a PROCESSOR would be suitable for execution on a VPU.

An optional loop which leads back to the extraction portion after analysis based on suitable decision criteria to execute this loop with extraction specifications according to the analysis permits optimization of the translation results. This is thus an iteration. This procedure is preferred.

A loop may be introduced into the compiler run at various points.

The resulting NML code is to be partitioned according to the properties of the VPU used as needed, i.e., broken down into individual portions which may be mapped into the particular resources available.

A plurality of such mechanisms, in particular those based on graphic analysis, are known per se according to the related art. However, a preferred variant is based on analysis of the program sources and is known by the term temporal partitioning. This method is described in the aforementioned Ph.D. thesis by Cardoso, which is herewith incorporated to the full extent for disclosure purposes.

Partitioning methods, regardless of the type, are to be adapted according to the type of VPU used. When using VPUs which allow storage of intermediate results in registers and/or memories, the tie-in of the memories for storage of data and/or states is to be taken into account through the partitioning. The partitioning algorithms (e.g., the temporal partitioning) are to be adapted accordingly. Usually the actual partitioning and scheduling are greatly simplified and made possible in a reasonable manner for the first time through these patents.

Many VPUs offer the possibility of differential reconfiguration. This may be used when only relatively few changes within the configuration of PAEs are necessary in a reconfiguration. In other words, only the changes in a configuration in comparison with the present configuration are reconfigured. The partitioning in this case may be done so that the possibly differential configuration following a configuration contains only the required configuration data and does not constitute a complete configuration. It is possible to also take into account the configuration data overhead for analytical purposes in evaluating the partitioning efficiency.

The scheduling mechanisms for the partitioned codes may be expanded so that scheduling is controlled by acknowledgment messages of the VPU to the particular unit being reconfigured (CT and/or HOSTRECONF). In particular, the resulting possibility of a conditional execution, i.e., explicit determination of the subsequent partition by the state of the instantaneous partition, is utilized in partitioning. In other words, it is possible to optimize the partitioning so that conditional executions such as IF, CASE, etc. are taken into account.

If VPUs which have the ability to transmit status signals between PAEs are used, the PAEs responding to the particular states transmitted and/or cooperating in their processing, then within the partitioning and the scheduling, the additional execution may also be taken into account within the configuration of PAEs, i.e., without the necessity of complete or partial reconfiguration due to an altered conditional program run.

In addition, scheduling may support the possibility of preloading configurations during the run time of another configuration. A plurality of configurations may also be preloaded speculatively, i.e., without being certain that the configurations are needed at all. Through selection mechanisms, the configurations that are used may then be selected at run time (see also the example NLS in DE 100 50 442.6, EP 01 102 674.7).

According to an additional or alternative variant, data processing within the VPU connected to the CPU requires exactly the same number of cycles as data processing within the computation pipeline of the CPU. In the case of today's high-performance CPUs having a plurality of pipeline stages (>20) in particular, this concept may be used ideally. The special advantage is that no separate synchronization measures such as RDY/ACK are necessary and/or no adaptation of opcodes to the register control is necessary. In this method, the compiler must ensure that the VPU maintains the required number of cycles and that data processing may be balanced by the insertion of delay stages such as a fall-through FIFO, such as that described in other patent applications cited above.

The code that is output is usually completely processable on the particular downstream compilers, preferably without any additional measures. If necessary, compiler flags and constraints may be generated for controlling downstream compilers, in which case the user may optionally add his or her own specifications and/or may modify the specifications generated. The downstream compilers do not require any significant modifications, so that standard conventional tools may in principle be used.

The method proposed here is thus suitable in particular as a preprocessor and/or as a processor method, for example, upstream from compilers and development systems. However, it should be pointed out explicitly that instead of and/or together with the translator described previously, compilers according to PACT11 (DE 101 39 1706; US 2003/0056202) may also be involved in principle.

An FPGA may be connected to the architecture described here, in particular directly to the VPU, to permit fine-grained data processing and/or to permit a flexibly adaptable interface (e.g., various serial interfaces (V24, USB, etc.), various parallel interfaces, hard drive interfaces, Ethernet, telecommunications interfaces (a/b, T0, ISDN, DSL, etc.)) to additional modules. The FPGA may be configured from the VPU architecture, in particular by the CT and/or by the CPU. The FPGA may be operated statically, i.e., without run time reconfiguration, and/or dynamically, i.e., with run time reconfiguration.

Providing an interface code has already been mentioned. The interface code which is inserted into the extracted code may be predefined by various methods. The interface code is preferably stored in a database which is accessed. The unit for implementation may be designed to take into account a selection, e.g., by the programmer, in which the appropriate interface code is selected, e.g., based on instructions in the PROGRAM or by compiler flags. An interface code suitable for the implementation method of the VPU/CPU system, used in each case, may be selected.

The database itself may be created and maintained by various methods. A few examples will be presented here to illustrate the possibilities:

a) The interface code may be predefined by the supplier of the compiler for certain connection methods between the VPU and CPU(s). This may be taken into account in the organization of the database by keeping an appropriate memory device ready and available for this information.

b) The interface code may be written by the user himself, who determined the system structure, or it may be modified from existing (exemplary) interface code and added to the database. The database is preferably designed to be user-modifiable in this regard to allow the user to modify the database.

c) The interface code may be generated automatically by a development system using which the system structure of the VPU-CPU system has been planned and/or described and/or tested, for example.

The interface code is usually preferably designed in such a way that it conforms to the requirements of the programming language in which the extracted code was written and into which the interface code is to be inserted.

Debugging and Integration of the Tool Sets

Communication routines may be introduced into the interface codes to synchronize various development systems for the PROCESSOR and the VPU. In particular, code for the particular debugger (e.g., according to PACT11) may also be included.

The interface code is designed to control and/or enable data exchange between the PROCESSOR and the VPU. It is therefore a suitable and preferred interface for controlling the particular development systems and debuggers. For example, it is possible to activate a debugger for the PROCESSOR as long as the data is being processed by the processor. As soon as the data is transferred via the interface code to one or more VPUs, a debugger for the VPUs is to be activated. If the code is sent back to the PROCESSOR, the PROCESSOR debugger is again to be activated. It is therefore also possible and preferable to handle such sequences by inserting control codes for debuggers and/or development systems into the interface code.

Communication and control between the different development systems should therefore preferably be handled via control codes introduced into the interface codes of the PROCESSOR and/or VPU. The control codes may largely correspond to existing standards for the control of development systems.

Administration and communication of the development systems are preferably handled as described in the interface codes, but they may also be handled separately from them (if appropriate) according to a corresponding similar method.

In many programming languages, in particular in sequential languages such as C, a precise chronological order is predetermined implicitly by the language. In the case of sequential programming languages, this is accomplished by the sequence of individual instructions, for example. If required by the programming language and/or the algorithm, the time information may be mapped onto synchronization models such as RDY/ACK and/or REQ/ACK or to a time stamp method.

For example, a subsequent FOR loop may be run and iterated only when a variable (inputstream here) is acknowledged with a RDY in each run. If there is no RDY, the loop run is stopped until RDY is received:

```
while TRUE
    s:=0
    for i: 1 to 3
        s:=s+inputstream;
```

The property of sequential languages of being controlled only by instruction processing is connected to the data flow principle of controlling processing through the data flow, i.e., the existence of data. In other words, an instruction and/or a statement (e.g., s:=s+inputstream) is processed only when it is possible to execute the operation and the data is available.

It is noteworthy that this method does not usually result in any change in the syntax or semantics of a high-level language.

More complex functions of a high-level language such as looping are implemented by macros. The macros are predefined by the compiler and are instantiated at the translation time.

Macros are constructed either of simple language constructs of the high-level language or they are constructed at the assembler level. Macros may be parameterized to permit simple adaptation to the algorithm described (see also PACT11).

A standard processor, e.g., an RISC, CISC or DSP (CPU), is thus linked to a reconfigurable processor (VPU).

Two different linkage variants, but preferably variants that may also be implemented simultaneously, may be described as follows.

A first variant includes a direct link to the instruction set of a CPU (instruction set linkage).

A second variant involves linkage via tables in the main memory. Tabulation means are therefore provided in this variant.

Free unused instructions are usually present within an instruction set (ISA) of a CPU. One or more of these free unused instructions is now used to control VPUs (VPU-CODE).

A configuration unit (CT) of a VPU is triggered by the decoding of a VPUCODE, and executes certain sequences as a function of the VPUCODE. There is thus a responsive CT for VPU decoding.

A VPUCODE may, for example, trigger the loading and/or execution of configurations by the configuration unit (CT) for a VPU.

In an expanded embodiment, a VPUCODE may be translated to different VPU instructions via a translation table which is preferably managed by the CPU, or alternatively it may also be managed by the CPU, by a VPU, or from an external unit.

The configuration table may be set as a function of the CPU program or code section that has been executed.

After arrival of a load instruction, the VPU loads configurations out of its own memory or a memory shared with the CPU. In particular, a VPU configuration may be included in the code of the CPU program being executed at the moment.

After receiving an execution instruction, a VPU executes the configuration to be executed and performs the corresponding data processing. The end of data processing may be indicated to the CPU by a termination signal (TERM). Appropriate signal lines/interrupt inputs, etc. are present and/or configured accordingly.

Due to the occurrence of a VPUCODE, wait cycles may be executed on the CPU until the termination signal (TERM) of the termination of data processing by the CPU arrives.

In a preferred embodiment, processing of the next code continues. If another VPUCODE occurs, then it is possible to wait for the preceding code to be terminated or all the VPCODEs that have been started are queued in a processing pipeline or a task switch is performed, in particular as described below.

Termination of data processing is signaled by the arrival of the termination signal (TERM) in a status register. Termination signals arrive in the order of a possible processing pipeline.

Data processing on the CPU may be synchronized to the arrival of a termination signal by testing the status register.

In one possible embodiment, a task switch may be triggered if an application cannot be continued before the arrival of TERM, e.g., due to data dependencies.

It is preferable if loose links are established between processors and VPUs, in which VPUs function largely as independent coprocessors.

Such a linkage involves one or more shared data sources and data sinks, usually over shared bus systems and/or shared memories. Data is exchanged between a CPU and a VPU via DMAs and/or other memory access controllers. Data processing is preferably synchronized via an interrupt control or a status query mechanism (e.g., polling).

A tight linkage corresponds to the direct linkage of a VPU to the instruction set of a CPU, as described above.

In a direct arithmetic unit linkage, a high reconfiguration performance in particular is important. Therefore, wave reconfiguration is preferred. In addition, the configuration words are preferably preloaded so that when the instruction is executed, the configuration may be configured particularly rapidly (via wave reconfiguration, in the optimum case within one cycle). It would also be possible to provide a plurality of arrays, identical arrays in particular, instead of a partial array configuration in the case of high-performance applications, but also in the case of primarily low-performance applications in particular, and to reconfigure at least one of these for a new task, in particular in advance, and then to change easily and completely to another array as needed instead of a reconfiguration or partial reconfiguration of an integral multidimensional coarse-grained field which is partially reconfigurable in run-time. Signals may be sent to the subarrays, e.g., via MUX/DEMUX stages, in particular I/O signals, data signals, status signals, and/or trigger signals.

For wave reconfiguration, the configurations that are presumably to be executed will preferably be recognized in advance by the compiler at compilation time and preloaded accordingly at run time.

At the time of instruction execution, the corresponding configuration is optionally selected and executed individually for each PAE and/or for a PAE subset. Such methods are also described in the publications identified above.

A preferred implementation may provide for different data transfers between a CPU and a VPU. Three particularly preferred methods that may be used individually or in combination are described below.

In the case of register linkage, the VPU may take data from a CPU register, process it and write it back to a CPU register.

Synchronization mechanisms are preferably used between the CPU and the VPU.

For example, the VPU may receive a RDY signal due to the data being written to the CPU register by the CPU and then the VPU may process the data thus written. Readout of data from a CPU register by the CPU may result in an ACK signal, which thus signals to the VPU data acceptance by the CPU. Use of the conventional RDY/ACK protocol in a different manifestation is advantageous in the present case precisely with coarse-grained cells of reconfigurable units.

CPUs do not typically make similar mechanisms available.

Two possible implementations are described in greater detail.

One approach that is easily implemented is to perform the data synchronization via a status register. For example, the VPU may indicate to the status register the successful readout of data from a register and the associated ACK signal and/or input of data into a register and the associated RDY signal. The CPU first tests the status register and performs wait loops or task switching, for example, until the RDY or ACK is received, depending on the operation. The CPU will then continue to perform the particular register data transfer.

In an expanded embodiment, the instruction set of the CPU is expanded by adding load/store instructions with an integrated status query (load_rdy, store_ack). For example, a new data word is written into a CPU register only when the register has first been read out by the VPU and an ACK signal has been received. Accordingly, load_rdy reads data out of a CPU register only when the VPU has previously entered new data and generated a RDY signal.

Data belonging to a configuration to be executed may be written to the CPU registers and/or may be read out of the registers successively more or less by block moves as in the related art. Block move instructions that are implemented if necessary may preferably be expanded by the integrated RDY/ACK status query described here.

A plurality of modifications and different embodiments of this basic method are possible.

The wave reconfiguration mentioned above allows starting of a new VPU instruction and the corresponding configuration as soon as the operand of the previous VPU instruction has been accepted from the CPU registers. The operands for the new instruction may be written directly into the CPU register after the instruction start.

According to the wave reconfiguration method, the VPU is reconfigured successively for the new VPU instruction on completion of data processing of the previous VPU instruction, and the new operands are processed.

In addition, data may be exchanged between a VPU and a CPU through suitable bus accesses to shared resources.

If there is to be an exchange of data that has been processed by the CPU just prior to the exchange and therefore is presumably still in the cache of the CPU which is preferably to be provided or if the data is processed by the CPU immediately next and therefore is logically placed in the cache of the CPU, this data is preferably read by the VPU out of the cache of the CPU or it is written to the cache of the CPU. This may be determined largely in advance at the compilation time through suitable analyses of the application by the compiler and the binary code may be generated accordingly.

If there is to be an exchange of data that is presumably not in the cache of the CPU and/or is presumably not needed subsequently in the cache of the CPU, it is preferably read directly by the VPU from the external bus and the data source connected to it (e.g., memory, peripheral) and/or written to the external bus and the data sink associated with it (e.g., memory, peripheral). This may be ascertained by the compiler largely in advance at compilation time of the application through suitable analyses, and the binary code may be generated accordingly.

In a transfer over the bus bypassing the cache, a protocol between the cache and the bus is preferably implemented, ensuring correct contents of the cache. For example, the conventional MESI protocol may be used for this purpose.

The methods described here need not at first have any particular mechanism for operating system support. It is preferable to ensure that an operating system to be executed behaves according to the status of a VPU to be supported, which is possible and to which end in particular schedulers may be provided.

In the case of a tight arithmetic unit linkage, the status register of the CPU into which the linked VPU enters its data processing status (termination signal) is preferably queried. If further data processing is to be transmitted to the VPU and the VPU has not yet terminated the previous data processing, the system will wait and/or a task switch will preferably be performed.

For coprocessor coupling, mechanisms controlled via the operating system, in particular the scheduler, are preferably used.

A simple scheduler may either allow the current task to continue running on the CPU after transfer of a function to a VPU, if it is able to run independently and simultaneously with data processing on a VPU. If or as soon as the task must wait for termination of data processing on the VPU, the task scheduler switches to another task.

Each task newly activated will check (if it uses the VPU) before use on whether the VPU is available for data processing and/or whether it is still processing data at the present time. Either it must then wait for termination of data processing or preferably the task is switched.

A simple and nevertheless efficient method may be created by so-called descriptor tables which may be implemented as follows, for example.

Each task generates one or more tables (VPUCALL) having a suitable fixed data format in the memory area assigned to it for callup of the VPU. This table contains all the control information for a VPU such as the program/configuration to be executed and/or the pointer to the memory location(s) or data sources of the input data and/or the memory location(s) or data sinks of the result data and/or additional execution parameters, e.g., data array variables.

The memory area of the operating system contains a table or an interlinked list (LINKLIST) which points to all the VPUCALL tables in the order of their creation.

Data processing on the VPU then takes place in such a way that a task creates a VPUCALL and calls up the VPU via the operating system. The operating system creates an entry in the LINKLIST. The VPU processes the LINKLIST and executes the particular VPU call referenced. The termination of the particular data processing is indicated by a corresponding entry in the LINKLIST and/or VPUCALL table.

The VPU thus works largely independently of the CPU. The operating system and/or the particular task must only monitor the tables (LINKLIST and/or VPUCALL).

These two methods are particularly efficient in performance if the VPU used has an architecture which allows reconfiguration that is and/or may be superimposed on data processing.

It is thus possible to start a new data processing and possibly a reconfiguration associated with it, immediately after reading the last operands out of the data sources. In other words, it is no longer the termination of data processing, but instead reading the last operands is necessary for synchronization. This greatly increases the performance in data processing.

The possible use of an operating system has an additional influence on the handling of states. Operating systems use task schedulers, for example, for managing multiple tasks to permit multitasking.

Task schedulers interrupt tasks at a certain point in time, start other tasks and, after the latter have been processed, resume processing of the interrupted task. Locally relevant states may remain unsaved if it is ensured that a configuration (which corresponds to processing of a task) will be terminated only after complete processing—i.e., when all data and states to be processed within this configuration cycle have been saved.

However, if the task scheduler interrupts configurations before they have been completely processed, local states and/or data must be stored. In addition, this is advantageous when the processing time of a configuration cannot be predicted. In conjunction with the known holding problem and the risk that a configuration will not be terminated at all (e.g., due to an error), this also seems appropriate to prevent a deadlock of the entire system.

In other words, taking into account task switching, relevant states may also be regarded as states which are necessary for task switching and correct restart of data processing.

Thus, in task switching the memory for results and, if necessary, also the memory for the operands must be saved and restored again at a later point in time, i.e., on returning to this task. This may be performed by a method comparable to the conventional PUSH/POP instructions and methods. In addition, the state of data processing, i.e., the pointer to the last operand processed completely, must be saved. Reference should be made here in particular to PACT18.

Depending on the optimization of task switching, there are two options, for example:

a) The interrupted configuration is reconfigured and only the operands are loaded. Data processing begins anew as if the processing of the configuration had not even been started. In other words, all data computations are executed from the beginning, and if necessary, computations are even performed in advance. This option is simple but not very efficient.

b) The interrupted configuration is reconfigured, the operands and results that have already been calculated being loaded into the particular memory. Data processing is continued with the operands that have not been completely computed. This method is much more efficient, but it presupposes that additional states which occur during processing of the configuration may become relevant, if necessary; for example, at least one pointer to the last operand completely computed must be saved, so that it is possible to begin again with their successors after reconfiguration.

A particularly preferred variant for managing relevant data is made available through the context switching described below. In task switching and/or in executing and switching configurations (see, for example, patent application PACT15 (PCT/EP02/02398), which is herewith fully included for disclosure purposes) it may be necessary to save data or states, which are not typically saved together with the working data in the memories for a following configuration because they merely mark an end value, for example.

Context switching according to the present invention is implemented by removing a first configuration while the data to be saved remains in the corresponding memories (REGs) (memories, registers, counters, etc.).

A second configuration is loaded, connecting the REG in a suitable manner and in a defined order to one or more global memories.

The configuration may use address generators, for example, to access the global memory (memories). The configuration may use address generators, for example, to access REGs designed as memories. According to the configured connection between the REGs, the contents of the REGs are written into the global memory in a defined order, with the particular addresses being specified by address generators. The address generator generates the addresses for the global memory (memories) so that the memory areas containing data (PUSH AREA) of the first configuration that has been removed may be assigned unambiguously.

In other words, different address spaces are preferably provided for different configurations. This configuration corresponds to a PUSH of conventional processors.

Other configurations then use the resources.

The first configuration should be restarted. Before that, a third configuration interconnecting the REGs of the first configuration in a defined order is started.

The configuration may use address generators, for example, to access the global memory (memories).

The configuration may use address generators, for example, to access REGs configured as memories.

An address generator generates addresses so that correct access to the PUSH AREA assigned to the first configuration is achieved. The generated addresses and the configured order of the REGs are such that the data of the REGs is output from the memories and into the REGs in the original order. The configuration corresponds to that of a POP of conventional processors.

The first configuration is restarted.

In summary, a context switch is performed so that by loading particular configurations which operate like PUSH/POP of conventional processor architectures, the data to be saved is exchanged with a global memory.

The function is to be illustrated in an example. A function adds up two rows of numbers, where the length of the rows is not known at translation time, but instead is known only at run time.

proc example
    while i<length do
        x[i]=a[i]+b[i]

This function is now interrupted during execution, e.g., by a task switch, or because the memory provided for x is full. At this point in time, a, b and x are in memories according to the present invention; i and optionally length must be saved, however.

To do so, the configuration "example" is terminated, with the register content being saved and a configuration push being started, reading i and length out of the registers and writing them into a memory.

proc push
    mem[<push_adr_example>]=i
    push_adr_example++
    mem{<push_adr_example>]=length According to this embodiment, push is terminated and the register content may be deleted.

Other configurations are executed. After a period of time, the example configuration is restarted.

Before that, a configuration pop is started, and it reads the register contents out of the memory again.

proc pop
    i=mem[<push_adr_example>]
    push_adr_example++
    length=mem[<push_adr_example>]

After execution, pop is terminated and the register contents remain unchanged. The configuration "example" is restarted.

DETAILED DESCRIPTION

Figure 1:
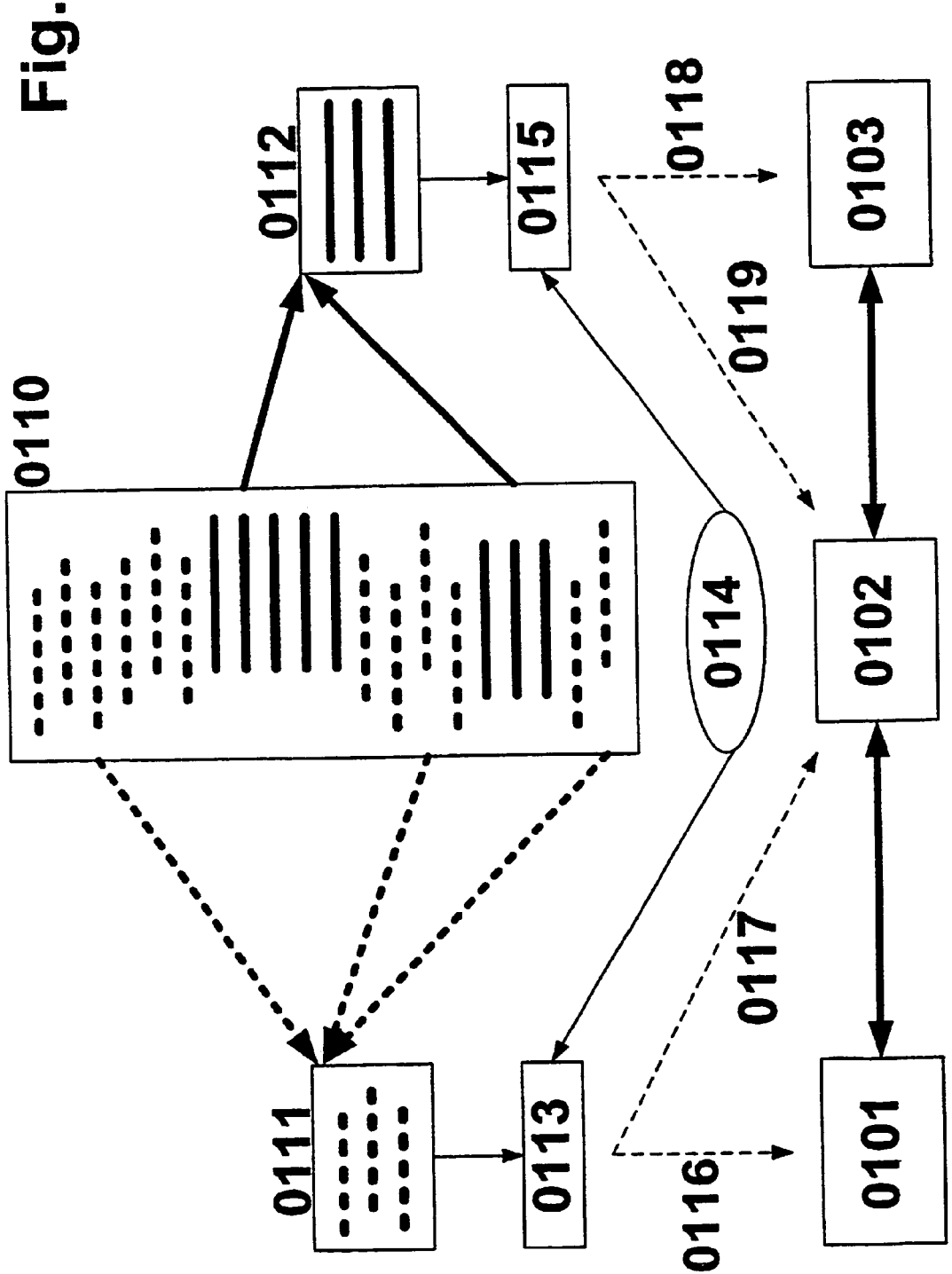
FIG. 1 shows an example of a possible system structure.

FIG. 1 illustrates an example of, in accordance with the present invention, an example method and shows a possible system structure, a PROCESSOR (0101) being connected to a VPU (0103) via a suitable interface (0102) for data exchange and status exchange.

A PROGRAM code (0110) is broken down (e.g., by a preprocessor for a compiler) into a portion (0111) suitable for the PROCESSOR and a VPU-suitable portion (0112), for example, according to the extraction methods described here.

Portion 0111 is translated by a standard compiler (0113) corresponding to the PROGRAM code, the additional code from a database (0114) for description and management of the interface (0102) between the PROCESSOR and a VPU being previously inserted. Sequential code executable on 0101 is generated (0116) and the corresponding programming (0117) of the interface (0102) is generated if necessary. The standard compiler may be of a type that is available as a conventional commercially available tool or as a portion of a development environment that is commercially available. The preprocessor and/or possibly the VPU compiler and/or possibly the debugger and additional tools may be integrated into an existing commercially available development environment, for example.

Portion 0112 is translated by a VPU compiler (0115), additional code for description and management of the interface (0102) being inserted from a database (0114). Configurations executable on 0103 are generated (0118) and, if necessary, the corresponding programming (0119) of the interface (0102) is also generated. It should be pointed out explicitly that in principle, compilers as described in DE 101 39 170.6 may also be used for 0115.

Figure 2:
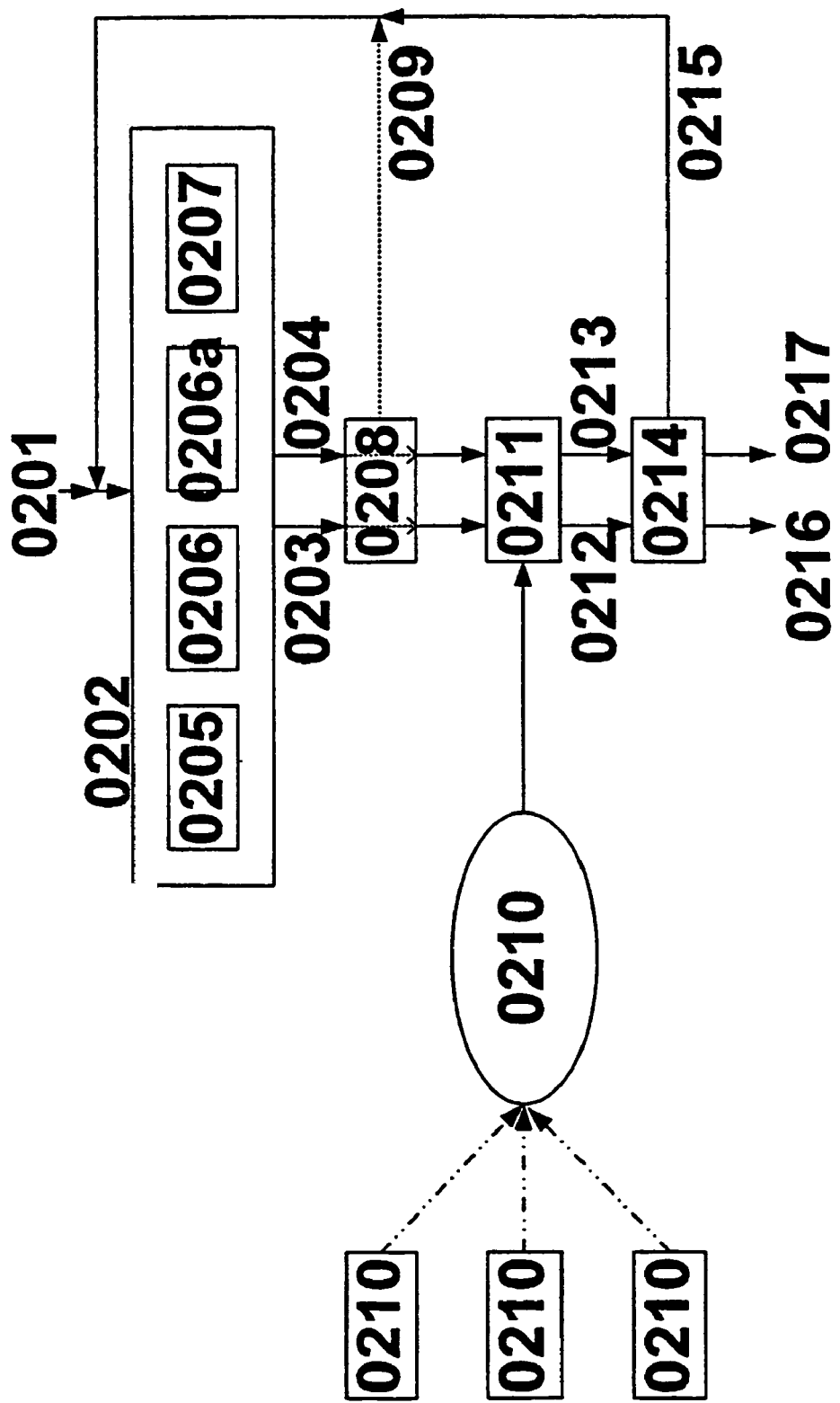
FIG. 2 shows an example compilation sequence.

FIG. 2 shows a basic compilation sequence as an example. In the extraction unit (0202), a PROGRAM (0201) is broken down into VPU code (0203) and PROCESSOR code (0204) according to different methods. Different methods may be used in any combination for extraction, e.g., instructions in the original PROGRAM (0205) and/or subprogram calls (0206) and/or analytical methods (0207) and/or utilization of object-oriented class libraries (0206a). The code extracted is translated, if necessary, and checked for its suitability for the particular target system (0208), if necessary. Feedback (0209) to the extraction is possible to obtain improvements due to modified allocation of the codes to a PROCESSOR or a VPU and/or a plurality of same.

Thereafter (0211) VPU code 0203 is expanded (0212) using the interface code from a database (0210) and/or (0204) is expanded using the interface code from 0210 to 0213.

The resulting code is analyzed for its performance (0214) and, if necessary, feedback (0215) to the extraction is possible to obtain improvements due to modified allocation of the codes to the PROCESSOR or a VPU.

The resulting VPU code (0216) is forwarded for further translation to a downstream compiler suitable for the VPU. For further translation, the resulting PROCESSOR code (0217) is processed further in any downstream compiler suitable for the PROCESSOR.

It should be pointed out that individual steps may be omitted, depending on the method. Generally, however, at least largely complete code, which is directly translatable without significant intervention by the programmer, or at least without any significant intervention, is output to the particular downstream compiler systems.

It is thus proposed that a preprocessor means be provided with a code input for supplying code to be compiled, with code analyzing means, in particular code structure and/or data format and/or data stream recognition and/or evaluation units, and with a segmenting evaluation unit for evaluating a code segmentation performed in response to signals from the code analyzing unit and, if necessary, with an iteration means for repeating a code segmentation until stable and/or sufficiently acceptable values are achieved, and with at least two partial code outputs, a first partial code output outputting partial code for at least one conventional processor, and at least one additional partial code output outputting code intended for processing by means of reconfigurable logic units, in particular multidimensional units having cell structures, in particular register means which process coarse-grained data and/or logic cells (PAEs) having arithmetic units and the like plus allocated register units, if necessary, and/or a fine-grained control means and/or monitoring means, such as state machines, RDY/ACK trigger lines and communication lines, etc. Both partial code outputs may be located at one physical output as serial multiplex outputs.

The database for the interface codes (0210) is constructed independently of and prior to the compiler run. For example, the following sources for the database are possible: predefined by the supplier (0220), programmed by the user (0221) or generated automatically by a development system (0222).

Figure 3:
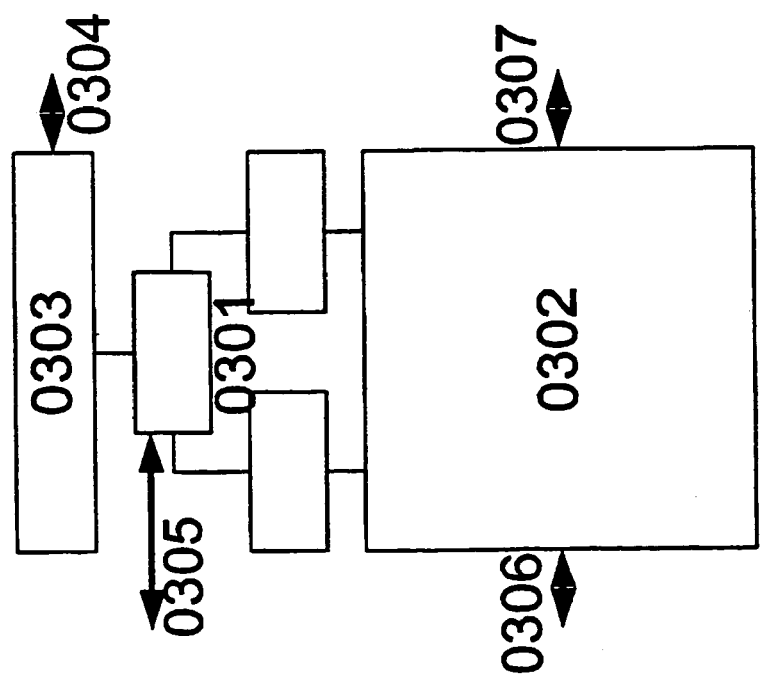
FIG. 3 shows the structure of an example VPU.

FIG. 3 shows the structure of a particularly preferred VPU. Preferably hierarchical configuration managers (CTs) (0301) control and manage a system of reconfigurable elements (PACs) (0302). The CTs are assigned a local memory for the configurations (0303). The memory also has an interface (0304) to a global memory which makes the configuration data available. The configuration runs in a controllable manner via an interface (0305). An interface of the reconfigurable elements (0302) to sequence control and event management (0306) is present, as is an interface to the data exchange (0307). An interface of the reconfigurable elements (0302) for sequence control and event management (0306) is present as is an interface for data exchange (0307).

Figure 4:
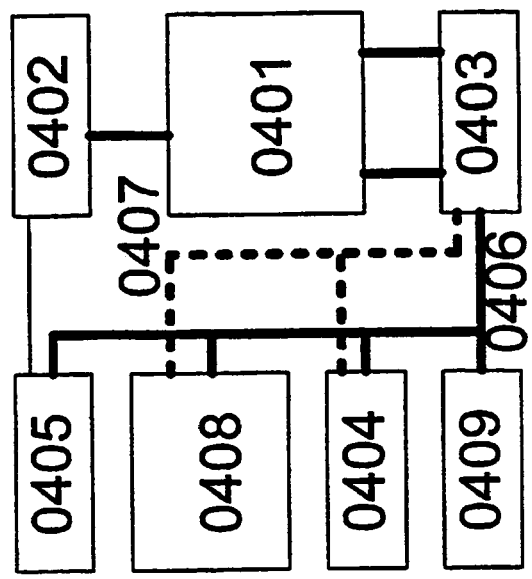
FIG. 4 shows an example CPU.

FIG. 4 shows details of an exemplary CPU system, e.g., a DSP of the C6000 type (0401) by Texas Instruments. This shows the program memory (0402), data memory (0403), any peripheral device (0404) and EMIF (0405). A VPU is integrated (0408) as a coprocessor via a memory bus (0406) and a peripheral bus (0407). A DMA controller (EDMA) (0409) may perform any DMA transfers, e.g., between the memory (0403) and the VPU (0408) or the memory (0403) and the peripheral device (0404).

Figure 5:
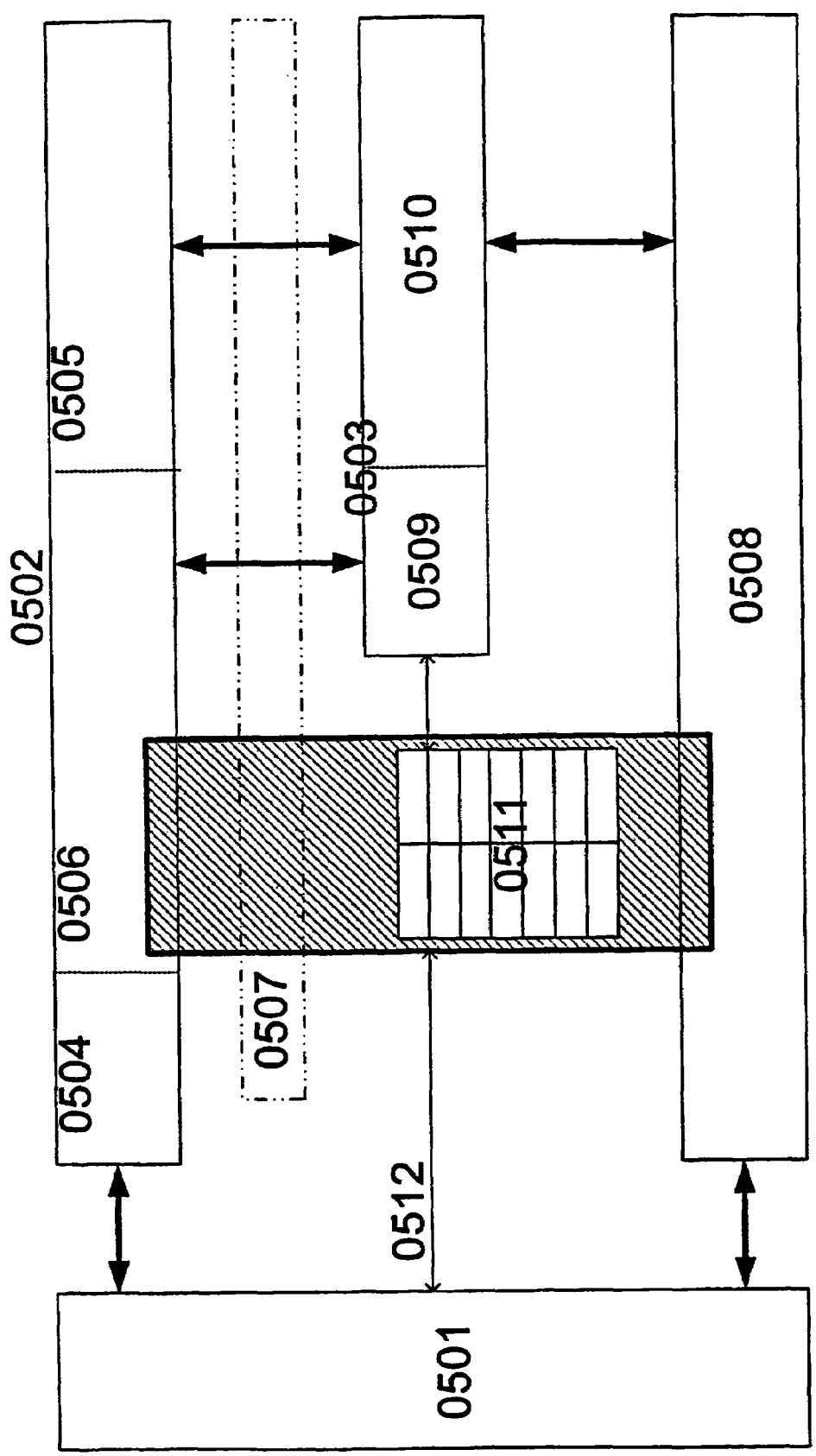
FIG. 5 shows an example abstract system definition.

FIG. 5 shows a more abstract system definition. A CPU (0501) is assigned a memory (0502) to which it has reading access and/or writing access. A VPU (0503) is connected to the memory. The VPU is subdivided into a CT portion (0509) and the reconfigurable elements for data processing (0510).

To increase the memory accesses, the memory may have a plurality of independent access buses (multiport). In a particularly preferred embodiment, the memory is segmented into a plurality of independent segments (memory banks), each bank being independently accessible. All the segments are preferably located within a uniform address space. One segment is preferably available mainly for the CPU (0504) and another segment is mainly available for data processing by the VPU (0505) while yet another segment is mainly available for the configuration data of the VPU (0506).

Typically and preferably, a fully configured VPU will have its own address generators and/or DMAs to perform data transfers. Alternatively and/or additionally, it is possible for a DMA (0507) to be provided within the system (FIG. 5) for data transfers with the VPU.

The system includes IO (0508) which may be accessible by the CPU and VPU.

The CPU and VPU may each have dedicated memory areas and IO areas to which the other has no access.

A data record (0511) which may be in the memory area and/or in the IO area and/or partially in one of the two is used for communication between the CPU and the VPU, e.g., for exchanging basic parameters and control information. The data record may contain the following information, for example:

1. Basic address(es) of the CT memory area in 0506 for localizing the configurations.
2. Basic address(es) of data transfers with 0505.
3. IO address(es) of data transfers with 0508.
4. Synchronization information, e.g., resetting, stopping, starting the VPU.
5. Status information on the VPU, e.g., errors or states of data processing.

The CPU and the VPU are synchronized by data polling and/or preferably by interrupt control (0512).

Figure 6:
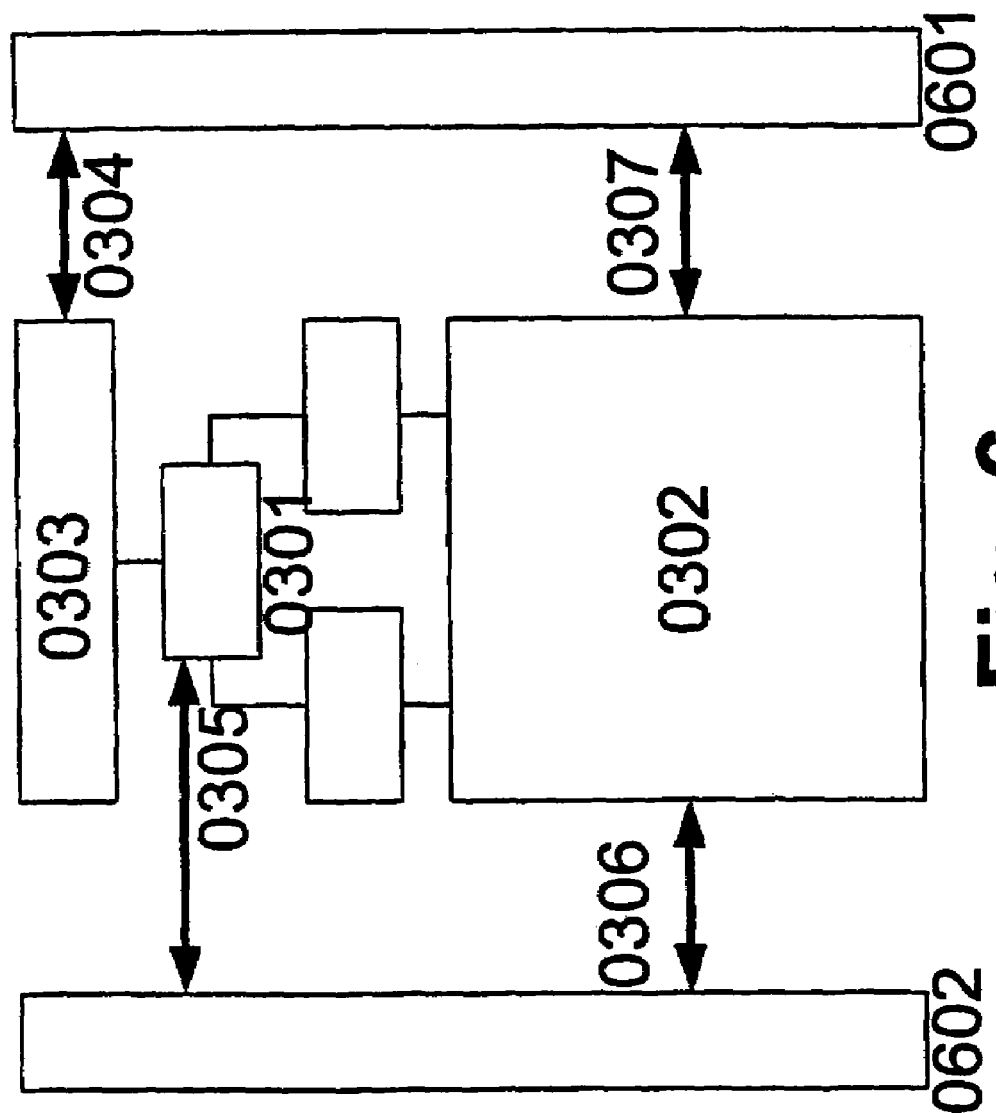
FIG. 6 shows an example interface.

FIG. 6 shows one possible embodiment of the interface structure of a VPU for tying into a system similar to that shown in FIG. 5. To do so, a memory/DMA interface and/or an IO interface is assigned (0601) to the VPU for data transfer; another system interface (0602) is responsible for sequence control such as managing interrupts, starting and stopping the processing, exchange of error states, etc.

The memory/DMA interface and/or IO interface is connected to a memory bus and/or an IO bus.

The system interface is preferably connected to an IO bus, but alternatively or additionally, it may also be connected to a memory according to 0511.

The interfaces (0601, 0402) may be designed for adaptation of different working frequencies of the CPU and/or the VPU and/or the system; for example, the system and/or the CPU may currently operate at 500 MHz and the VPU at 200 MHz.

The interfaces may perform a translation of the bus protocols, e.g., the VPU-internal protocol may be converted to an external AMBA bus protocol. They thus trigger bus protocol translation means and/or are designed for bus protocol translation, in particular bus protocol translation between an internal VPU protocol and a known bus protocol. It is also possible to provide for conversion directly to CPU-internal bus protocols.

The memory/DMA interface and/or the IO interface supports memory access by the CT to an external memory, which is preferably performed directly (memory mapped). The data transfer of the CT(s) and/or PAC(s) may be buffered, e.g., via FIFO stages. External memories may be addressed directly; in addition, DMA-internal and/or external DMA transfers are also performed.

Data processing, e.g., the initialization, i.e., the start of configurations, is controlled via the system interface. In addition, status and/or error states are exchanged. Interrupts for the control and synchronization between the CTs and a CPU may be supported.

The system interface is capable of converting VPU-internal protocols so that they are converted to external (standard) protocols (e.g., AMBA).

A preferred method of code generation for the system described here is described herein. This method describes a compiler which breaks down program code into code for a CPU and code for a VPU. The breakdown is performed by different methods on different processors. In a particularly preferred embodiment, the particular codes broken down are expanded by adding the interface routines for communication between CPU and VPU. The expansion may be performed automatically by the compiler.

The following tables show examples of communication between a CPU and a VPU. The columns are assigned to the particular active function units: CPU, system DMA and DMA interface (EDMA) and/or memory interface (memory I/F), system interface (system I/F, 0602), CTs and the PAC. The individual cycles are entered into the cells in the order of their execution. K1 references a configuration 1 that is to be executed.

The first table shows as an example a sequence when using the system DMA (EDMA) for data transfer:

| CPU | EDMA | System I/F | CTs | PAC |
|---|---|---|---|---|
| Initiate K1 | | | | |
| Start K1 | Load K1 | | Configure K1 | |
| Initiate loading of data by EDMA | | Start K1 | | Wait for data |
| Initiate reading of data by EDMA | Data transfer read data | | | Data processing |
| | Data transfer write data | Signal the end of the operation | | |

It should be pointed out that synchronization between the EDMA and the VPU is performed automatically via interface 0401, i.e., DMA transfers take place only when the VPU is ready.

A second table shows a preferred optimized sequence as an example. The VPU itself has direct access to the configuration memory (0306). In addition, data transfers are executed by DMA circuit within the VPU, which may be fixedly implemented, for example, and/or formed by the configuration of configurable parts of the PAC.

| CPU | EDMA | System I/F | CTs | PAC |
|---|---|---|---|---|
| Initiate K1 | | | | |
| Start K1 | Read the configuration | | Configure K1 | |
| | Data transfer read data | Start K1 | | Read data |
| | | | | Data processing |
| | Data transfer write data | Signal the end of the operation | | Write data |

The complexity for the CPU is minimal.

In summary, the present invention relates to methods that permit translation of a traditional high-level language such as Pascal, C, C++, Java, etc., onto a reconfigurable architecture. This method is designed so that only those portions of the program that are to be translated and are suitable for the reconfigurable target architecture are extracted. The remaining portions of the program are translated onto a conventional processor architecture.

Figure 7:
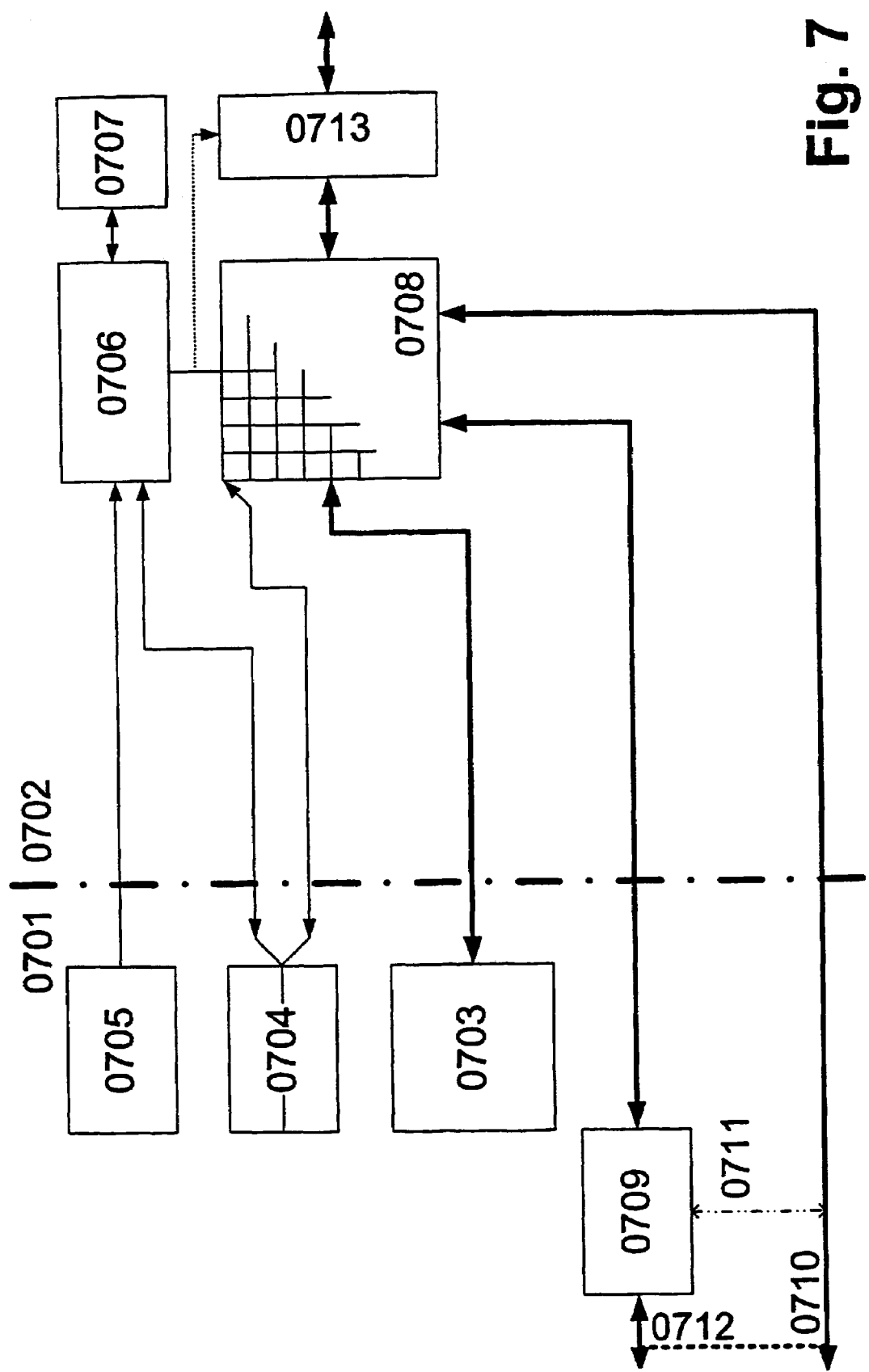
FIG. 7 shows data transfers between VPU and CPU.

For reasons of simplicity, FIG. 7 shows only the relevant components (in particular the CPU), although a significant number of other components and networks would typically be present.

A preferred implementation such as that in FIG. 7 may provide different data transfers between a CPU (0701) and a VPU (0702). The configurations to be executed on the VPU are selected by the instruction decoder (0705) of the CPU, which recognizes certain instructions intended for the VPU and triggers the CT (0706), so that it loads the corresponding configurations out of a memory (0707) assigned to the CT—which may be shared with the CPU in particular or may be the same as the working memory of the CPU—into the array of PAEs (PA, 0108).

CPU registers (0703) are provided to obtain data in a register connection, to process the data and to write it back to a CPU register. A status register (0704) is provided for data synchronization. In addition, a cache is also provided, so that when data that has just been processed by the CPU is to be exchanged, it is still presumably in the cache (0709) of the CPU and/or will be processed immediately thereafter by the CPU.

The external bus is labeled as (0710) and through it, data is read out of a data source (e.g., memory, peripheral device) connected to it, for example, and/or is written to the external bus and the data sink connected to it (e.g., memory, peripheral device). This bus may in particular be the same as the external bus of the CPU (0712 & dashed line).

A protocol (0711) between cache and bus is implemented, ensuring the correct contents of the cache. An FPGA (0713) may be connected to the VPU to permit fine-grained data processing and/or to permit a flexible adaptable interface (0714) (e.g., various serial interfaces (V24, USB, etc.), various parallel interfaces, hard drive interfaces, Ethernet, telecommunications interfaces (a/b, T0, ISDN, DSL, etc.)) to additional modules and/or the external bus system (0712).

Figure 8:
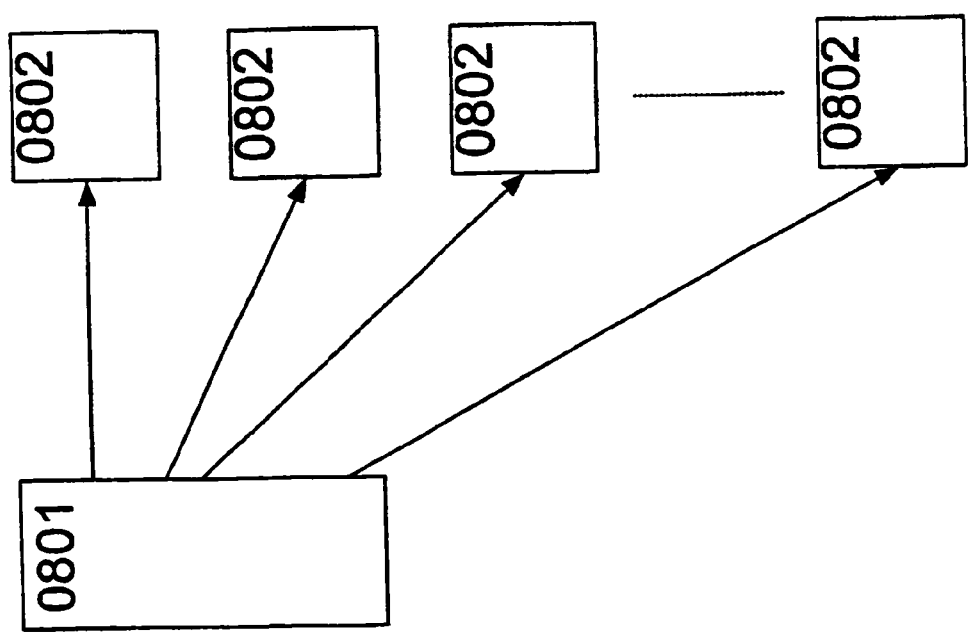
FIG. 8 shows a memory area of the operating system.

According to FIG. 8, the memory area of the operating system contains a table or an interlinked list (LINKLIST, 0801) which points to all VPUCALL tables (0802) in the order in which they are created.

What is claimed is:

1. A method for translating a data processing program for a system including at least one first processor and a reconfigurable unit, the method comprising:
   determining from the program, code portions of the program suitable for the reconfigurable unit;
   extracting the determined code portions for processing by the reconfigurable unit;
   extracting remaining code portions of the program for processing by the first processor; and
   appending interface code to at least one of (a) the code portions extracted for the reconfigurable unit and (b) the code portions extracted for the first processor, the appended interface code controlling communication of data to be processed between the first processor and the reconfigurable unit and enabling communication between the reconfigurable unit and the first processor by one of (a) transferring the data to be processed via dedicated memory areas and (b) transferring base addresses of memory locations in which the data to be processed is located;
   wherein:
   the data to be processed is processed by the reconfigurable unit via execution of the determined code portions; and
   the suitability determination includes consideration of a plurality of factors, the plurality of factors including a data type of the data to be processed and a size of the data to be processed.

2. The method as recited in claim 1, wherein the determining step includes determining the code portions based on automated analyses.

3. The method as recited in claim 1, wherein the program includes instructions defining the code portions to be extracted, and wherein the method further comprises automatically analyzing the instructions.

4. The method as recited in claim 1, wherein the code portions to be extracted are determined based on calls of subprograms.

5. The method as recited in claim 1, wherein the interface code provides at least one of memory linkage, register linkage, and linkage via a network.

6. The method as recited in claim 1, further comprising:
   analyzing at least one of the extracted code portions and results achievable with a given extraction; and
   restarting an extraction with new improved parameters based on the analysis.

7. The method as recited in claim 1, further comprising:
   appending control code to the extracted code for at least one of management, control, and communication of the development system.

8. The method as recited in claim 1, wherein the first processor includes at least one of a von-Neumann architecture, Harvard architecture, controller, CISC processor, RISC processor, VLIW processor, and DSP processor.

9. The method as recited in claim 1, wherein the remaining code is extracted so that it is translatable via any ordinary unmodified compiler that is suitable for the first processor.

10. The method as recited in claim 1, wherein the appended interface code is system specific so that it enables the communication according to the system.

11. The method as recited in claim 1, wherein the code portions are executable by both the first processor and the reconfigurable unit.

12. The method as recited in claim 1, further comprising:
    in accordance with reconfiguration data, reconfiguring the reconfigurable unit for execution of the determined code portions to process the data to be processed.

13. The method as recited in claim 1, wherein:
    the reconfigurable unit includes a plurality of configurable elements;
    in accordance with reconfiguration data, a reconfiguration unit configures the plurality of configurable elements for processing the data to be processed, the data to be processed being communicated between the first processor and one or more of the plurality of configurable elements in a communication that bypasses the reconfiguration unit.

14. The method as recited in claim 13, wherein the reconfigurable unit includes the reconfiguration unit.

15. A method for translating a data processing program for a system including at least one first processor and a reconfigurable unit, the method comprising:
    determining from the program, code portions of the program suitable for the reconfigurable unit;
    extracting the determined code portions for processing by the reconfigurable unit;

extracting remaining code portions of the program for processing by the first processor;

modifying at least one of (a) the code portions extracted for the reconfigurable unit and (b) the code portions extracted for the first processor to include interface code that controls communication of data to be processed between the first processor and the reconfigurable unit, and that enables communication between the reconfigurable unit and the first processor by one of (a) transferring the data to be processed via dedicated memory areas and (b) transferring base addresses of memory locations in which the data to be processed is located; and compiling the modified code by at least one compiler;

wherein:

the data to be processed is processed by the reconfigurable unit via execution of the determined code portions; and the suitability determination includes consideration of a plurality of factors, the plurality of factors including a data type of the data to be processed and a size of the data to be processed.

16. A device for data processing, comprising:

a first processor;

a reconfigurable unit; and an arrangement configured to perform a method to translate a data processing program, the method including:

determining from the program, code portions of the program suitable for the reconfigurable unit;

extracting the determined code portions for processing by the reconfigurable unit;

extracting remaining code portions of the program for processing by the first processor; and modifying at least one of (a) the code portions extracted for the reconfigurable unit and (b) the code portions extracted for the first processor to include interface code that controls communication of data to be processed between the first processor and the reconfigurable unit, and that enables communication between the reconfigurable unit and the first processor by one of (a) transferring the data to be processed via dedicated memory areas and (b) transferring base addresses of memory locations in which the data to be processed is located;

wherein:

the data to be processed is processed by the reconfigurable unit via execution of the determined code portions; and the suitability determination includes consideration of a plurality of factors, the plurality of factors including a data type of the data to be processed and a size of the data to be processed.

17. The device as recited in claim 16, wherein:

the device is configured to exchange the data to be processed and status information between the first processor and the reconfigurable unit, wherein the exchange is at least one of: i) during processing of one or more programs, ii) without having to interrupt data processing on the reconfigurable processor, and iii) without having to interrupt data processing on the first processor; and, the status information indicates a status of operations including at least one of zero, carry, overflow, equal, ready, not-ready, and error.

18. The device as recited in claim 16, wherein the determination is based on calls of subprograms.

19. The device as recited in claim 16, wherein the method further comprises:

analyzing at least one of the extracted code portions and results achievable with a given extraction; and restarting an extraction with new improved parameters based on the analysis.

20. The device as recited in claim 16, wherein the determination includes determining the code portions based on automated analyses.

* * * * *

UNITED STATES PATENT AND TRADEMARK OFFICE
CERTIFICATE OF CORRECTION

PATENT NO. : 7,657,877 B2
APPLICATION NO. : 10/480003
DATED : February 2, 2010
INVENTOR(S) : Vorbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1020 days.

Signed and Sealed this

Thirtieth Day of November, 2010

David J. Kappos
*Director of the United States Patent and Trademark Office*